United States Patent
Talarico et al.

(10) Patent No.: US 12,369,158 B2
(45) Date of Patent: Jul. 22, 2025

(54) MULTIPLEXING CONFIGURED GRANT TRANSMISSIONS IN NEW RADIO SYSTEMS OPERATING ON UNLICENSED SPECTRUM

(71) Applicant: Apple Inc., Cupertino, CA (US)

(72) Inventors: Salvatore Talarico, Sunnyvale, CA (US); Gang Xiong, Portland, CA (US); Yingyang Li, Beijing (CN); Yongjun Kwak, Gyeonggi-do (KR); Jose Armando Oviedo, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 686 days.

(21) Appl. No.: 17/442,569

(22) PCT Filed: Jul. 1, 2020

(86) PCT No.: PCT/US2020/040500
§ 371 (c)(1),
(2) Date: Sep. 23, 2021

(87) PCT Pub. No.: WO2021/003273
PCT Pub. Date: Jan. 7, 2021

(65) Prior Publication Data
US 2022/0174722 A1    Jun. 2, 2022

(51) Int. Cl.
*H04W 4/00*    (2018.01)
*H04W 72/0446*    (2023.01)
*H04W 72/1268*    (2023.01)
*H04W 72/21*    (2023.01)
*H04W 72/23*    (2023.01)
(Continued)

(52) U.S. Cl.
CPC ....... *H04W 72/23* (2023.01); *H04W 72/0446* (2013.01); *H04W 72/1268* (2013.01); *H04W 72/21* (2023.01); *H04W 74/002* (2013.01); *H04W 74/0816* (2013.01)

(58) Field of Classification Search
None
See application file for complete search history.

(56) References Cited

U.S. PATENT DOCUMENTS

2018/0006790 A1*   1/2018   Park ...................... H04L 1/1664
2018/0039286 A1*   2/2018   Tirpak ................. G05D 1/0653
(Continued)

FOREIGN PATENT DOCUMENTS

WO     2020223658     11/2020

OTHER PUBLICATIONS

Outcome of Offline Discussion on Configured Grant Enhancement, Vivo, R1-1905792, 3GPP TSG RAN WGI#96bis, Apr. 8-12, 2019, 27 pages.
(Continued)

*Primary Examiner* — Bob A Phunkulh
(74) *Attorney, Agent, or Firm* — Kilpatrick Townsend & Stockton LLP

(57) ABSTRACT

The present application relates to wireless devices, and more particularly to apparatus, systems, and methods for multiplexing configured Grant (CG) transmissions in New Radio (NR) systems operating on unlicensed spectrum. In some embodiments, uplink control information may be transmitted in one or more configured grant physical uplink shared channels mapped to a respective one or more mini-slots.

14 Claims, 9 Drawing Sheets

(51) Int. Cl.
*H04W 74/00* (2009.01)
*H04W 74/0816* (2024.01)

(56) References Cited

U.S. PATENT DOCUMENTS

| | | | | |
|---|---|---|---|---|
| 2019/0053218 | A1* | 2/2019 | Kim | H04L 1/1812 |
| 2019/0150198 | A1* | 5/2019 | Sun | H04L 5/0082 370/329 |
| 2019/0306922 | A1* | 10/2019 | Xiong | H04W 72/21 |
| 2020/0077470 | A1* | 3/2020 | Xiong | H04W 24/08 |
| 2020/0351861 | A1* | 11/2020 | Mukherjee | H04L 1/1864 |
| 2020/0404651 | A1* | 12/2020 | Takeda | H04L 5/1469 |
| 2021/0068100 | A1* | 3/2021 | Takeda | H04W 72/23 |
| 2021/0194622 | A1* | 6/2021 | Takeda | H04L 1/0016 |
| 2021/0204311 | A1* | 7/2021 | Takeda | H04L 1/1861 |
| 2021/0235477 | A1* | 7/2021 | Baldemair | H04W 72/21 |
| 2021/0250142 | A1* | 8/2021 | Wang | H04L 5/0053 |
| 2021/0377937 | A1* | 12/2021 | Takeda | H04W 72/20 |
| 2022/0046666 | A1* | 2/2022 | Takeda | H04W 72/1268 |
| 2022/0053483 | A1* | 2/2022 | Yoshioka | H04W 72/1268 |
| 2022/0201722 | A1* | 6/2022 | Takeda | H04L 1/189 |

OTHER PUBLICATIONS

Remaining Issues for Multiplexing UCI on PUSCH, Qualcomm Incorporated, R1-1802839, 3GPP TSG RAN WG1 Meeting #92, Feb. 26-Mar. 2, 2018, 13 pages.
Summary of 7.2.6.3 Enhanced Configured Grant PUSCH Transmissions, Ntt Docomo, Inc., R1-1901330, 3GPP TSG RAN WG1 Ad-Hoc Meeting 1901, Jan. 21-25, 2019, 51 pages.
International Patent Application No. PCT/US2020/040500, International Preliminary Report on Patentability, Mailed on Jan. 13, 2022, 10 pages.
International Patent Application No. PCT/US2020/040500, International Search Report and Written Opinion, Mailed on Sep. 30, 2020, 13 pages.
Designing 5G NR, Qualcomm, Available at: https://www.slideshare.net/qualcommwirelessevolution/making-5g-nrnew-radio-a-commercial-reality, Sep. 2018, 37 pages.
Remaining issues on UL data transmission for URLLC, vivo, 3GPP TSG RAN WG1 Meeting #92bis, R1-1806070, May 21-25, 2018, 5 pages.
Discussion on the enhancements to configured grants, vivo, 3GPP TSG RAN WG1 Meeting #97, R1-1906133, May 13-17, 2019, 10 pages.
Study on NR-based Access to Unlicensed Spectrum, Qualcomm Inc., 3GPP TSG RAN Meeting #82, RP-182397, Dec. 10-13, 2018, 19 pages.
NR-based Access to Unlicensed Spectrum, Qualcomm Inc., 3GPP TSG RAN Meeting #82, RP-182400, Dec. 10-13, 2018, 6 pages.
NR-based Access to Unlicensed Spectrum, Qualcomm Inc., 3GPP TSG RAN Meeting #82, RP-182789, Dec. 10-13, 2018, 7 pages.
NR-based Access to Unlicensed Spectrum, Qualcomm Inc., 3GPP TSG RAN Meeting #82, RP-182806, Dec. 10-13, 2018, 7 pages.
3rd Generation Partnership Project; Technical Specification Group Radio Access Network; Study on NR-based access to unlicensed spectrum (Release 16), 3GPP TR 38.889 V16.0.0, Dec. 2018, 119 pages.
3rd Generation Partnership Project; Technical Specification Group Radio Access Network; NR; Multiplexing and channel coding (Release 15), 3GPP TS 38.212 V15.6.0, Jun. 2019, 101 pages.
3rd Generation Partnership Project; Technical Specification Group Radio Access Network; NR; Physical layer procedures for control (Release 15), 3GPP TS 38.213 V15.6.0, Jun. 2019, 107 pages.
3rd Generation Partnership Project; Technical Specification Group Radio Access Network; NR; Physical layer procedures for data (Release 15), 3GPP TS 38.214 V15.6.0, Jun. 2019, 105 pages.
3rd Generation Partnership Project; Technical Specification Group Radio Access Network; NR; Radio Resource Control (RRC) protocol specification (Release 15), 3GPP TS 38.331 V15.6.0, Jun. 2019, 519 pages.

* cited by examiner

300 

```
┌─────────────────────────────────┐
│ Determining CG-PUSCH is to be   │
│ transmitted in mini-slot        │
│ 304                             │
└─────────────────────────────────┘
                 │
                 ▼
┌─────────────────────────────────────┐
│ Selecting UCI based on determination│
│ that CG-PUSCH is to be transmitted  │
│ in mini-slot                        │
│ 308                                 │
└─────────────────────────────────────┘
                 │
                 ▼
┌─────────────────────────────────────┐
│ Encoding CG-PUSCH with selected UCI │
│ for transmission in mini-slot       │
│ 312                                 │
└─────────────────────────────────────┘
```

FIG. 3

MULTIPLEXING CONFIGURED GRANT TRANSMISSIONS IN NEW RADIO SYSTEMS OPERATING ON UNLICENSED SPECTRUM

RELATED APPLICATIONS

The present application is a 371 U.S. National Phase of PCT International Patent Application No. PCT/US2020/040500, filed Jul. 1, 2020, entitled MULTIPLEXING CONFIGURED GRANT TRANSMISSIONS IN NEW RADIO SYSTEMS OPERATING ON UNLICENSED SPECTRUM, which claims priority to U.S. Provisional Patent Application No. 62/869,258, filed Jul. 1, 2019, and entitled DESIGN OF MULTIPLEXING RULES FOR CONFIGURED GRANT TRANSMISSIONS IN NR SYSTEMS OPERATING ON UNLICENSED SPECTRUM. The disclosure of said applications are hereby incorporated by reference in their entireties.

FIELD

The present application relates to wireless communication systems and, more particularly, to apparatuses, systems, and methods for multiplexing configured grant transmissions in New Radio systems that operate on unlicensed spectrum.

BACKGROUND

Each year, the number of mobile devices connected to wireless networks significantly increases. In order to keep up with the demand in mobile data traffic, changes have to be made to system requirements to be able to meet these demands. Three areas that may be enhanced in order to deliver this increase in traffic are larger bandwidth, lower latency, and higher data rates.

One of the limiting factors in wireless innovation is the availability in spectrum. To mitigate this, the unlicensed spectrum has been an area of interest to expand the availability of long term evolution (LTE). In this context, one major enhancement for LTE in third generation partnership project (3GPP) Release 13 has been to enable its operation in the unlicensed spectrum via licensed assisted access (LAA), which expands the system bandwidth by utilizing a flexible carrier aggregation (CA) framework introduced by the LTE-Advanced system.

BRIEF DESCRIPTION OF DRAWINGS

A better understanding of the present subject matter can be obtained when the following detailed description of various embodiments is considered in conjunction with the following drawings.

FIG. 3 illustrates an operation flow/algorithmic structure in accordance with some embodiments.

Figure 1:
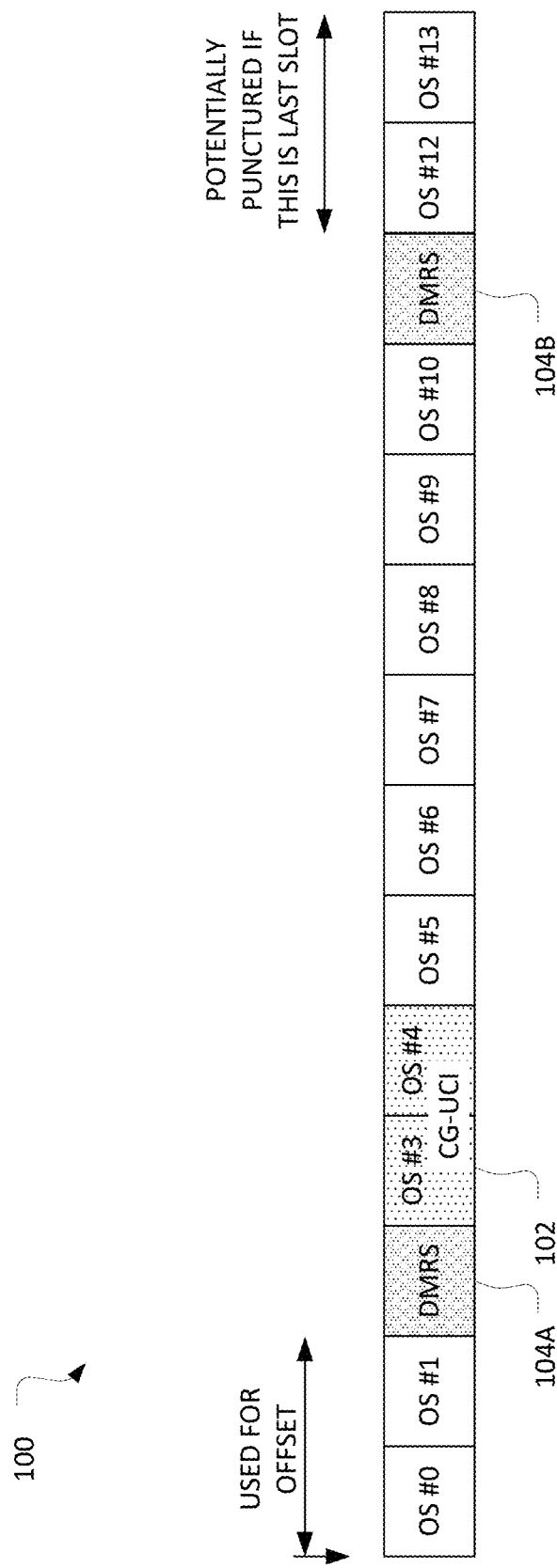
FIG. 1 illustrates a slot structure in accordance with some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, bat on the contrary, the intention is to cover all modifications, equivalents and alternatives falling within the spirit and scope of the subject matter as defined by the appended claims.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure:

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate army (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry. The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that am communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

3GPP Fifth Generation (5G) New Radio (NR) systems may improve LTE and LTE-A operation on an unlicensed spectrum. Objectives with respect to utilizing shared/unlicensed spectrum in 5G NR may include both physical layer aspects, which is handled by radio access network (RAN) working group 1 (WG1), and physical layer procedures, which is handled by RAN WG1 and RAN working group 2 (WG2).

The physical layer aspects may include a frame structure that includes single and multiple downlink (DL)-to-uplink (UL) and UL-to-DL switching points within a shared channel occupancy time (COT) with associated identified listen-before-talk (LBT) requirements. See, for example, Technical Report (TR) 38.889, v16.0.0 (2018 Dec. 19), Section 7.2.1.3.1. The physical layer aspects may also include: an UL data channel that includes extension of a physical uplink shared channel (PUSCH) to support physical resource block (PRB)-based frequency block interlaced transmission; support of multiple PUSCH(s) starting positions in one or multiple slot(s) depending on an LBT outcome with an understanding that an ending position may be indicated by an UL grant; a design not requiring a user equipment (UE) to change a granted transport block size (TBS) for a PUSCH transmission depending on an LBT outcome. Various PUSCH enhancements based on cyclic prefix orthogonal frequency division multiplexing (CP-OFDM) may also be considered. Applicability of sub-PRB frequency block-interlaced transmission for 60 kilohertz (kHz) may be decided by RAN WG1.

Physical layer procedures may include, for load based equipment (LBE), a channel access mechanism in line with agreements from NR unlicensed spectrum (NR-U) study item (see, for example, TR 38.889, section 7.2.1.3.1). Physical layer procedures may also include hybrid automatic repeat request (HARQ) operation concepts. For example, NR HARQ feedback mechanisms may be baseline for NR-U operation with extensions in-line with agreements during a study phase (see, for example, TR 38.889, section 7.2.1.3.3) including immediate transmission of HARQ acknowledgment/negative acknowledgment (A/N) for corresponding data in a same shared COT as well as transmission of HARQ A/N in a subsequent COT. Support mechanisms to provide multiple, supplemental time, and/or frequency domain transmission opportunities may be possible. Physical layer procedures may further include aspects related to scheduling multiple transmission time intervals (TTIs) for PUSCH in-line with agreements from a study phase (see, for example, TR 38.889, section 7.2.1.3.3). Physical layer procedures may further include aspects related to configured grant operation. For example, NR Type-1 and Type-2 configured grant mechanisms may be the baseline for NR-U operation with modifications in line with agreements during a study phase (see, for example, TR 38.889, section 7.2.1.3.4). Still further, physical layer procedures may include data multiplexing aspects (for both UL and DL) considering LBT and channel access priorities.

One of the challenges of operating devices in unlicensed spectrum is to ensure a fair coexistence with other incumbent technologies. In order to do so, depending on a particular band in which devices operate, some restrictions might be taken into account when designing NR-U systems. For instance, if operating in a 5 gigahertz (GHz) band, a device may perform an LBT procedure to acquire the medium before a transmission can occur.

NR-U systems may be designed to allow configured grant (CG) operation on the unlicensed spectrum. In CG operation, a UE may be allowed to transmit uplink communications, for example, PUSCH, without having to receive individual resource allocations on a PDCCH. However, in some situations, a CG PUSCH may overlap with other UL transmissions. Some embodiments of the present disclosure addresses situations in which a CG PUSCH overlaps with a PUCCH. For example, various embodiments describe multiplexing or dropping rules to apply when CG PUSCH overlaps with grant-based uplink Control information (UCI) occasions. Gram-based UL control information, which may also be referred to as "scheduled UCI," may include, but is not limited to, HARQ-ACK, scheduling request (SR), and channel state information (CSI).

Configured Grant Transmissions Operating on Unlicensed Spectrum

When operating on unlicensed spectrum that requires contention-based protocols (for example, LBT) to access the channel, performance for a scheduled UL transmission may be degraded as compared to operating on licensed spectrum due to the "quadruple" contention for UEs to access the UL. As an example, before the UE can perform a UL transmission, the system may be subject to the following: 1) UE sends scheduling request (SR); 2) LBT performed at the gNB before sending UL grant (especially in the case of self-carrier scheduling); 3) UE scheduling (internal contention amongst UEs associated with the same gNB); and 4) LBT performed only by the scheduled UE. Furthermore, the four slots that may be needed for processing delay between UI, grant and PUSCH transmission represent an additional performance constraint.

To help overcome these issues, devices in NR-U systems may perform grant-free transmissions using CG operation. To help provide the UE with more flexibility and freedom, the CG UE in NR-U may independently attempt to transmit over predefined resources, and independently choose the HARQ ID process to use from a given pool. Since this information, together with the UE-ID and others, may be unknown at the gNB, the CG UE may transmit this information within a specific UCI, named here CG-UCI, within individual CG-PUSCHs.

Embodiments disclosed herein teach multiplexing and dropping rules for situation in which a CG PUSCH overlaps uplink control channel transmissions in, for example, PUCCH. Some embodiments disclosed include "always multiplex" embodiments, "only dropping" embodiments, and "drop or multiplex based on available resources" embodiments. It will be understood that these embodiments are not mutually exclusive. That is, aspects of each these embodiments may be combined with aspects from other embodiments.

"Always Multiplex" Embodiments

In one embodiment, when a PUCCH overlaps with CG PUSCH within a PUCCH group and if a timeline requirement defined in 3GPP Technical Specification (TS) 38.213 v15.6.0 (2019 Jun. 24), section 9.2.5, is satisfied, the existing UCI may be multiplexed together with the CG-UCI on the CG PUSCH. The existing UCI in the PUCCH may be UCI that has been granted resources by gNB for an uplink transmission. This UCI may also be referred to as "grant-based UC."

FIG. 1 illustrates a slot 100 for an NR transmission in accordance with some embodiments. The slot 100 may include fourteen orthogonal frequency division multiplexing (OFDM) symbols, labeled OS #0-OS #13. In various embodiments, a CG-PUSCH may be mapped to one or more of the OFDM symbols of the slot. The CG-PUSCH may be mapped based on a Type-A mapping type or a Type-B mapping type. The mapping type may indicate valid starting symbols and lengths for normal cyclic prefix (having 14 symbols per slot) or extended cyclic prefix (having 12 symbols per slot). The length may be defined as a duration in terms of symbols. The mapping type may also be used to determine a location of a demodulation reference signal (DMRS). For example, with Type-A mapping, the DMRS can be located within either symbol 2 or symbol 3 and, with Type-B mapping, the DMRS is located in a first symbol of the PUSCH. The Type-B mapping may correspond to the front-loaded configuration that allows a gNB receiver to estimate an uplink channel response in advance of receiving the uplink data.

As shown, the slot 100 illustrates a Type-A mapping in which a DMRS 104A is in OS #2. CG-UCI 102 may be scheduled to follow after the DMRS 104A. In certain cases, if a CG-UCI otherwise scheduled to following a DMRS 1043 would be the last symbol of a radio frame, the CG-UCI may be punctured (e.g., dropped). Note that the existing UCI (for example, the grant-based UCI) may include HARQ-ACK in response to PDSCH transmission or CSI report.

In one embodiment, the mapping order for all other existing UCIs may be defined as follows: CG-UCI is followed by HARQ-ACK, CSI part 1 and CSI part 2 if any, and then data. In another embodiment, the mapping order can be defined as follows: HARQ-ACK, followed by CG-UCI, CSI part 1 and CSI part 2 if any, and then data. In one embodiment, to help avoid blind detection or extra computing at the gNB, the CG-UCI may contain one or two bits indicating whether HARQ-ACK and/or CSI are multiplexed. In certain cases, if one bit is used, this bit may indicate whether multiplexing is performed or not. If two bits are provided, these may indicate whether multiplexing is not performed (for example, '00'), as well whether HARQ-ACK feedback (for example, '01') or CSI (for example, '10') or both (e.g., '11') are multiplexed with the CG-UCI.

In another embodiment, CG-UCI and HARQ-ACK feedback are encoded together, regardless of the HARQ-ACK feedback payload. The actual number of HARQ-ACK bits could be jointly coded with CG-UCI. Alternatively, if the number of HARQ-ACK bits is less than or equal to K bits, for example, K=2, K bits are added to CG-UCI and joint coding is performed. If the number of HARQ-ACK bits is higher than K, the actual number of HARQ-ACK bits could be jointly coded with CG-UCI. For the decoding of CG-UCI, the gNB can assume a different number of bits for GC-UCI based on knowledge of whether HARQ-ACK is transmitted and how many HARQ-ACK bits is transmitted.

In one embodiment, CG-UCI and HARQ-ACK feedback may be encoded together or as separately based on the HARQ-ACK feedback. For example, if HARQ-ACK<=2 bits, then CG-UCI and HARQ-ACK are encoded separately; and, if HARQ-ACK>2 bits, CG-UCI and HARQ-ACK are jointly encoded.

While slot 100 is shown as an example of a CG-PUSCH transmission using a Type-A mapping, other embodiments apply to CG-PUSCH transmissions using a Type-B mapping or a CG-PUSCH transmitted through a mini-slot. As used herein, a mini-slot may refer to uplink resources, for a relatively shorter PUSCH transmission, that do not include all symbols of a slot. In various embodiments, a mini-slot may include 2, 4, or 7 symbols. However, mini-slots in other embodiments may include other numbers of symbols. In various embodiments, mini-slot transmissions may be designed for transmitting a relatively small amount of data, which may be useful in machine-type communications or ultra-reliable, low-latency communications (URLLC).

In one embodiment, the CG-UCI is transmitted in each PUSCH transmission within a period (or CG burst), and may be mapped starting from the DMRS symbol(s) within each slot or mini-slot. In some embodiments, a CG-PUSCH may be transmitted in a mini-slot that includes a time allocation that spans across slot boundaries. These mini-slots may be referred to herein as "boundary mini-slots." Conversely, "non-boundary mini-slots" may refer to mini-slots that include time allocations located only in one slot. In some embodiments, CG-UCI may be transmitted only in CG-PUSCHs that are conveyed through non-boundary mini-slots. Consider, for example, a CG burst that includes a plurality of CG-PUSCH transmissions. The CG-PUSCH transmissions of the CG burst that correspond to non-boundary mini-slots may include CG-UCI, while the CG-PUSCH transmissions of the CG burst that correspond to boundary mini-slots may not.

In some embodiments, the CG-UCI may include a field for an indication of a starting and length value (SLIV) for each individual mini-slot within which the CG-UCI is transmitted, and/or indication of a repetition number of the corresponding transmission. An SLIV may be used to provide an indication of a starting symbol (S) of a mini-slot that carries the CG-PUSCH and a number of consecutive symbols (L) of the mini-slot. In some embodiments, the SLIV may be coded according to the following: if $(L-1)<=7$, then $SLIV=14\times(L-1)+S$; else $SLIV=14\times(14-L+1)+(14-1-S)$, where $0<L<=14-S$.

For the case where an LBT gap is located at the starting symbol S for a first CG-PUSCH, and the LBT gap is of length Y OFDM symbols, then the actual starting symbol of the PUSCH indicated in the CG-UCI may be OS #S+Y. Thus, OS #S+Y may contain the DMRS, which is transmitted in the first OFDM symbol after the LBT gap, and the length of the actual PUSCH transmission is L−Y. Consider, for example, that S=3, Y=2, and L=4. In this embodiment, the LBT gap may start at OS #3 and end at OS #4. The DMRS may occur at OS #5 and an actual length of the CG-PUSCH transmission will be 2 symbols, OS #5 and OS #6.

In one embodiment, the CG-UCI may indicate that the starting symbol S is the same as a starting symbol of an SLIV configured for a PUSCH through, for example, CG configuration information provided to the UE from a gNB. This may be the case even if the actual PUSCH starts at symbol S+Y.

In another embodiment, the CG-UCI may indicate the starting symbol as S+Y. This may provide the gNB with knowledge of an LBT gap, of length Y, at a beginning of the CG-PUSCH.

In another embodiment, the UE may be configured with an SLIV that indicates a starting symbol S, such that the LBT gap is configured to occur in the Y symbols prior to S. For example, if S=0 and Y=1, then the LBT gap is in OS #13 of the prior slot. In another example, if S=7 and Y=2, then the LBT gap is in OS #S and OS #6. In this case, the start symbol indicated by the CG-UCI may always be the same as that configured in the SLIV and the length of the PUSCH may always be L.

Figure 2:
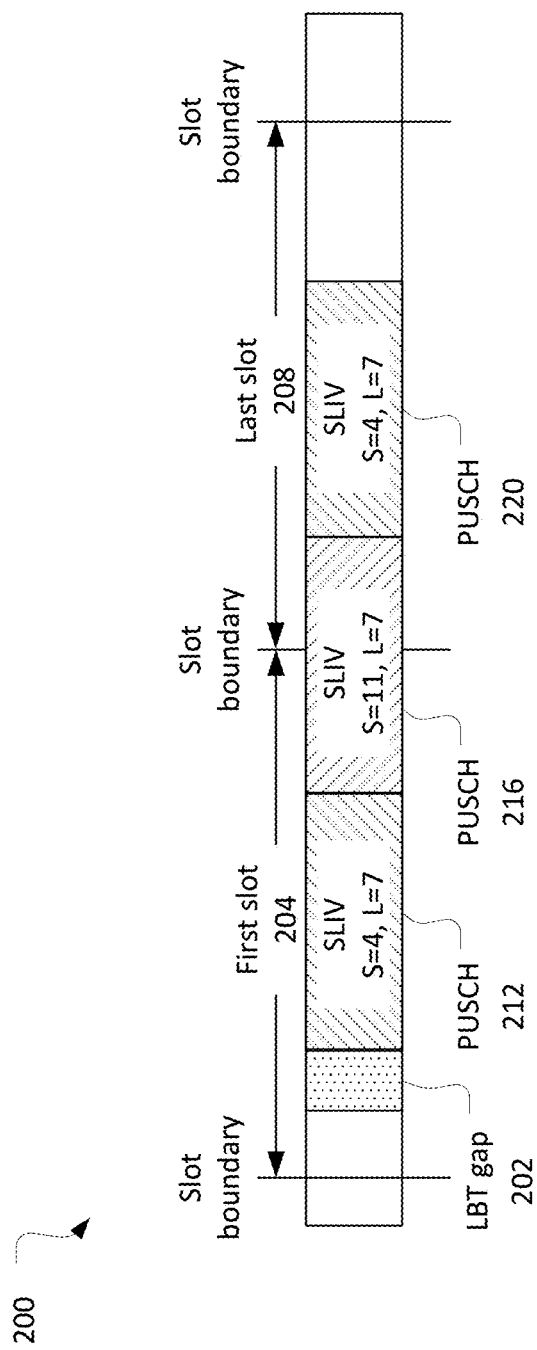
FIG. 2 illustrates a multi-slot structure in accordance with some embodiments.

FIG. 2 illustrates a transmission sequence 200 in accordance with some embodiments. The transmission sequence 200 may include a plurality of PUSCHs transmitted over a first slot 204 and a last slot 208. In particular, the transmission sequence 200 may include PUSCH 212, PUSCH 216, and PUSCH 220. An LBT gap 202 may occur prior to PUSCH 212. Each of the PUSCHs may include a length of seven. PUSCHs 212 and 220 may include a starting symbol of 4; while PUSCH 216 may include a starting symbol of 11. Given the respective lengths and starting symbols, both PUSCHs 212 and 220 may be mapped to uplink resources that are fully encompassed by a respective slot. Thus, PUSCH 212 and 220 may be mapped to respective non-boundary mini-slots. However, the starting symbol and length of PUSCH 216, on the other hand, may cause the PUSCH 216 to be mapped to uplink resources that span across a slot boundary. This may happen when, for example, S+L>14. Thus, the PUSCH 216 may be mapped to a boundary mini-slot. The mapping of the PUSCH 216 to the boundary mini-slot may have a direct impact on CG-UCI mapping (as discussed above).

In some embodiments, a UE may only transmit a portion a PUSCH mapped to a boundary mini-slot on the symbols of the boundary mini-slot that are within the first slot. The UE may puncture (for example, drop) a portion of the PUSCH mapped to symbols of the boundary mini-slot that are within the last slot. With respect to PUSCH 216, this may mean that a UE may transmit a portion of the PUSCH 216 that are on symbols OS #11-OS #13 of the first slot 204 and may drop the portion of the PUSCH 216 that are on symbols OS #0-OS #3 of the last slot 208.

As described above, if a UE uses mapping Type-B to map a PUSCH, a DMRS may be mapped to the first symbol in the slot/mini-slot and the CG-UCI may be mapped beginning in the next symbol. In some embodiments, if the start symbol is too late in a first slot, such that the DMRS and CG-UCI cannot be mapped to the symbols allocated at the end of the first slot, then the entire PUSCH may be dropped.

In some embodiments, a CG-PUSCH mapped to a boundary mini-slot may be broken up into two repetitions. A first repetition may be mapped to an end of the first slot, while a second repetition may be mapped to a beginning of the second slot. The combined length of the two repetitions may equal L. Each repetition may include a front-loaded DMRS, and the CG-UCI may be mapped to each repetition following the DMRS. The CG-UCI of each repetition may indicate a start symbol and length for the respective repetition. For example, considering the PUSCH 216, let $(S_1, L_1)$ and $(S_2, L_2)$ be the start symbols and lengths of the two respective repetitions. In this case, $(S_1=11, L_1=3)$ and $(S_2=0, L_2=4)$. The UCI (including CG-UCI or other UCI) may be multiplexed beginning from symbols 12 and 1, respectively. In some situations, this may result in a first portion of the UCI being mapped to one or more symbols starting at OS #12 of the first slot 204 while a second portion of the UCI is mapped to one or more symbols starting at OS #1 of the last slot 208. In another embodiment, UCI may be mapped to both repetitions, and both UCI may indicate S as the start symbol of the first repetition and length L as the length of the combined repetitions. For example, with reference to FIG. 2, S=11, L=7.

In another embodiment, the CG-UCI may only be mapped to a first repetition of the PUSCH 216, and $S_1=11, L_1=7$. In still another embodiment, the CG-UCI may only be mapped to the repetition with greater length. With the CG-UCI indicating $S_1=11, L_1=7$, it may be understood that the second repetition, in the last slot 208, may have the greater length and, therefore, may be mapped with the CG-UCI. In yet another embodiment, the CG-UCI may only be mapped to the first repetition, in first slot 204, and any scheduled UCI that is to be multiplexed on the PUSCH is mapped to the second repetition, in last slot 208, or vice-versa. In another embodiment, only CG-UCI is allowed when the PUSCH is mapped to a boundary mini-slot. For example, the CG-UCI may not be multiplexed with other UCI such as HARQ or other grant-based UCI.

Various embodiments may perform various LBT operations for a PUSCH mapped to a boundary mini-slot. For example, in a first embodiment, if a PUSCH is mapped to a boundary mini-slot, the LBT operation may only be performed for the first repetition, for example, for the portion of the PUSCH in the first slot. If the LBT operation fails, then the UE may not transmit either repetition. In another embodiment, an LBT operation may be allowed for a second repetition as well. For example, if an LBT operation fails for a first repetition, the UE may try an additional LBT for the second repetition.

"Only Dropping" Embodiments

In one embodiment, if CG PUSCH overlaps with PUCCH within a PUCCH group and if the timeline requirement as defined in Section 9.2.5 in 3GPP TS 38.213 is satisfied, either CG-UCI or the legacy UCIs (for example, grant-based UCI) carried within the PUCCH may be dropped according to a predefined order or priority rule. The predefined order or priority rule may indicate specific priority of CG-UCI compared to the other UCIs.

In one embodiment, the priority may be defined as follows, where the UCI are listed in descending priority order, that is, where the earlier listed UCI has a relatively higher priority:

HARQ-ACK→SR→CG-UCI→CSI part 1 (for example, part of CSI with fixed payload size)+CSI part 2 (for example, part of CSI with variable payload size).

If HARQ-ACK and/or SR are carried within the PUCCH, then CG PUSCH may be dropped. Otherwise, PUCCH may instead be dropped:

CG-UCI→HARQ-ACK→SR→CSI part 1→CST part 2.

In some embodiments, a high priority may be provided to the CG PUSCH, and when PUCCH overlaps with CG PUSCH, the PUCCH may dropped:

HARQ-ACK→SR→CST part 1→CSI part 2→CG-UCI.

In some embodiments, a high priority may be provided to the PUCCH, and when CG PUSCH overlaps with PUCCH, the CG-PUSCH may be dropped.

In another embodiment, if CG PUSCH overlaps with PUCCH within a PUCCH group and if the timeline requirement as defined in Section 9.2.5 in TS 38.213 is satisfied, the UE may only transmit one of the CG PUSCH and PUCCH, and may drop the other channel. In particular, the UE may first perform UCI multiplexing on PUCCH in accordance with the procedure as defined in Section 9.2.5 in TS 38.213. When the resulting PUCCH resource(s) overlaps with CG PUSCH, if the timeline requirement as defined in Section 9.2.5 in TS 38.213 is satisfied, and if one of UCI types in PUCCH(s) has higher priority than CG-UCI, the CG PUSCH may be dropped and the PUCCH(s) may be transmitted. If any of the UCI types in the PUCCH(s) has lower priority than CG-UCI, CG PUSCH is transmitted and PUCCH(s) is dropped. The priority rule can be defined as discussed above.

In another embodiment, the UE may transmit the CG PUSCH or PUCCH with earliest starting symbol and drop the other channel. If both channels have the same starting symbol, UE can drop the channel with shorter or longer duration.

In some embodiments, a type or duration of the PUSCH transmission may be used as a basis for determining the UCI that is carried by the PUSCH transmission. For example, in some embodiments, if a mini-slot PUSCH transmission has a length less than or equal to a predetermined threshold X, which may be in milliseconds or symbols, then either the CG-UCI or the grant-based UCI may be dropped. The UCI dropped may be based on the priorities discussed herein, "Drop or Multiplex Based on Available Resources" Embodiments In one embodiment, the existing UCI (for example, grant-based UCI) may be multiplexed together with the CG-UCI within the CG PUSCH if the resources are sufficient, otherwise either the CG PUSCH or the PUCCH may be dropped.

In one embodiment, if the CG PUSCH has sufficient resources to accommodate multiplexing then the mapping order for the UCIs may be as follows: CG-UCI first, and followed by HARQ-ACK, CSI part 1 and CSI part 2, and then finally data. In one embodiment, to help avoid blind detection or extra computing at the gNB, the CG-UCI may contain one or two bits indicating whether HARQ-ACK and/or CSI are multiplexed. If one bit is used, the bit may indicate whether multiplexing is performed or not. If two bits are provided, these bits may indicate multiplexing is not performed (for example, '00'), as well as whether HARQ- ACK feedback (for example, '01') or CSI (for example, '10') or both (for example, '11') are multiplexed with the CG-UCI.

In another embodiment, CG-UCI and HARQ-ACK feedback may always be encoded together.

In an embodiment, if the PUCCH and CG PUSCH overlap, and the resources available within the CG PUSCH are not sufficient to carry CG-UCI with the UCI carried on PUCCH, then either CG-UCI or the legacy UCIs carried within the PUCCH may be dropped according to a pre-defined list, which indicates their specific priority compared to the others UCIs.

In one embodiment, the priority may be defined as follows, where the UCI listed first has a relatively higher priority:

HARQ-ACK→CG-UCI→CSI part 1→CSI part 2.

In some embodiments, if HARQ-ACK is carried within the PUCCH, then the CG PUSCH may be dropped. Otherwise, the PUCCH may instead be dropped:

CG-UCI→HARQ-ACK→CSI part 1→CSI part 2.

In some embodiments, high priority may be provided to the CG PUSCH, and when the PUCCH overlaps with the CG PUSCH, this may always be dropped:

HARQ-ACK→CSI part 1→CSI pad 2→CG-UCI.

In some embodiments, higher priority may be provided to the PUCCH, and when the CG PUSCH overlaps with the PUCCH, the CG-PUSCH may be dropped.

In another embodiment, if CG PUSCH overlaps with PUCCH within a PUCCH group, and if the timeline requirement as defined in Section 9.2.5 in TS 38.213 is satisfied, based on the resources available the UE may multiplex some of the uplink information on CG PUSCH based on one of the following priority lists:

HARQ-ACK→CG-UCI→CSI part 1→CSI part 2→data;
CG-UCI→HARQ-ACK→CSI part 1→CSI part 2→data; or
HARQ-ACK→CSI part 1→CSI part 2→CG-UCI→data.

In this case, the UE may perform encoding to allow use of all of the resource elements (REs).

In one embodiment, if data is dropped, the CG-UCI may also be dropped.

For the case when the PUSCH is mapped to boundary mini-slot, such that R symbols are available from the starting symbol of the PUSCH to the slot boundary, then the following multiplexing or dropping rules may be applied.

In one embodiment, if R is such that there are not enough resources to transmit the CG-UCI, then only the DMRS is mapped to the starting symbol, and HARQ-ACK and other grant-based UCI are rate-matched to the remaining R−1 symbols. In one embodiment, if the R symbols do not contain enough resources for the CG-UCI and the CG-UCI is dropped, then the CG PUSCH may be moved to the beginning of the next slot and other, for example, grant-based, UCI scheduled for this slot may be dropped for the first mini-slot transmission.

In another embodiment, if the R symbols are at the end of the slot contain enough resources for the DMRS and CG-UCI, then the HARQ-ACK and other legacy UCI are only multiplexed to the first repetition if enough resources are available, and dropped otherwise.

In some embodiments, if the PUSCH is broken up into two mini-slot PUSCHs repetitions, and the CG-UCI is mapped to the first repetition, then the CG-UCI may be dropped from the second repetition and only other UCI (for example, HARQ or other grant-based UCI) is mapped to the second repetition. In embodiments in which the CG-UCI is mapped to both the first and second repetitions, then the grant-based UCI may be multiplexed in the repetition with more resources (for example, the portion having more symbols). In some embodiments, if there are enough resources in each repetition, then the CG-UCI and grant-based UCI may be multiplexed on both repetitions.

"Configurable Dropping or Multiplexing" Embodiments

In one embodiment, the gNB may configure, for example through higher layer signaling or as indicated within the DCI, whether, and what type of dropping or multiplexing is to be used. For example, in some embodiments the gNB may configure the UE to do the always multiplex embodiments or the only dropping embodiments discussed herein.

Exemplary Encoding Rules

In one embodiment, CG-UCI may be encoded as follows:
If GC-UCI is encoded first, then:

$$Q'_{CG-UCI} = \min\left\{\left\lceil\frac{(O_{CG-UCI} + L_{CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\alpha \cdot \sum_{l=l_o}^{N_{symb,all}^{PUSCH}-1} M_{sc}^{UCI}(l)\right\rceil\right\}$$

If CG-UCI is encoded after HARQ-ACK feedback, then:

$$Q'_{CG-UCI} = \min\left\{\left\lceil\frac{(O_{CG-UCI} + L_{CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\alpha \cdot \sum_{l=l_o}^{N_{symb,all}^{PUSCH}-1} M_{sc}^{UCI}(l)\right\rceil - Q'_{ACK}\right\}$$

where $O_{CG-UCI}$ represents the number of bits that compose the CG-UCI, while $L_{CG-UCI}$ is the number of CRC bits. As for $\beta_{offset}^{PUSCH}$, this is equivalent to $\beta_{offset}^{PUSCH} = \beta_{offset}^{HARQ-ACK}$ or $\beta_{offset}^{PUSCH} = \beta_{offset}^{CSI-part1}$ or to a new beta offset for CG-UCI.

In one embodiment, if CG-UCI is encoded together with HARQ-ACK, CG-UCI and HARQ-ACK may be encoded as follows:

$$Q'_{CG-UCI+ACK} =$$

$$\min\left\{\left\lceil\frac{(O_{CG-UCI} + O_{ACK} + L_{CG-UCI+ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r}\right\rceil,\right.$$

$$\left.\left\lceil\alpha \cdot \sum_{l=l_o}^{N_{symb,all}^{PUSCH}-1} M_{sc}^{UCI}(l)\right\rceil\right\}$$

where $O_{CG-UCI}$ represents the number of bits that compose the CG-UCI, $O_{ACK}$ represents the number of bits that compose the HARQ-ACK, while $L_{CG-UCI+ACK}$ is the number of the CRC bits. As for $\beta_{offset}^{PUSCH}$, this is equivalent to a new set of beta offsets which are redefined so that to maintain the same reliability. As an alternative, if the HARQ-ACK is less or equal than 2 bits, HARQ-ACK and CG-UCI may be separately encoded, while, if the HARQ-ACK is larger than 2 bits, the HARQ-ACK and CG-UCI may be encoded together using the formula above.

In one embodiment, if the HARQ-ACK, is multiplexed with the CG-UCI, and encoded separately, the encoding of the HARQ-ACK may be done as follows:

If GC-UCI is encoded before HARQ-ACK:

$$Q'_{ACK} = \min\left\{\left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil,\right.$$

$$\left. \left\lceil \alpha \cdot \sum_{l=l_0}^{N_{symb,all}^{PUSCH}-1} M_{sc}^{UCI}(l) \right\rceil - Q'_{CG-UCI} \right\}$$

If GC-UCI is encoded after HARQ-ACK, then the legacy procedure can be reused as is.

In one embodiment, if the CSI part 1, is multiplexed with the CG-UCI, the encoding of the CSI part 1 may be done as follows:

If ACK-ACK and CG-UCI are encoded separately, then:

$$Q'_{CG-1} = \min\left\{\left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil,\right.$$

$$\left. \left\lceil \alpha \cdot \sum_{l=0}^{N_{symb,all}^{PUSCH}-1} M_{sc}^{UCI}(l) \right\rceil - Q'_{CG-UCI} - Q'_{ACK} \right\}$$

If ACK-ACK and CG-UCI are jointly encoded, then:

$$Q'_{CSI-1} = \min\left\{\left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil,\right.$$

$$\left. \left\lceil \alpha \cdot \sum_{l=0}^{N_{symb,all}^{PUSCH}-1} M_{sc}^{UCI}(l) \right\rceil - Q'_{CG-UCI+ACK} \right\}$$

In one embodiment, if the CSI part 2 is also multiplexed with the CG-UCI, the encoding of the CSI part 2 may be done as follows:

If ACK-ACK and CG-UCI are encoded separately, then:

$$Q'_{CSI-2} = \min\left\{\left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil,\right.$$

$$\left. \left\lceil \alpha \cdot \sum_{l=0}^{N_{symb,all}^{PUSCH}-1} M_{sc}^{UCI}(l) \right\rceil - Q'_{CG-UCI} - Q'_{ACK} - Q'_{CSI-1} \right\}$$

If ACK-ACK and CG-UCI are jointly encoded, then:

$$Q'_{CSI-2} = \min\left\{\left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil,\right.$$

$$\left. \left\lceil \alpha \cdot \sum_{l=0}^{N_{symb,all}^{PUSCH}-1} M_{sc}^{UCI}(l) \right\rceil - Q'_{CG-UCI+ACK} - Q'_{CSI-1} \right\}$$

In one embodiment, if data is dropped but CG-UCI is still transmitted and encoded together with HARQ-ACK, then CG-UCI and HARQ-ACK may be encoded as follows:

$$Q'_{CG-UCI+ACK} = \min\left\{\left\lceil \frac{(O_{ACK} + O_{CG-UCI} + L_{CG-UCI+ACK}) \cdot \beta_{offset}^{PUSCH}}{R \cdot Q_m} \right\rceil,\right.$$

$$\left. \left\lceil \alpha \cdot \sum_{l=l_0}^{N_{symb,all}^{PUSCH}-1} M_{sc}^{UCI}(l) \right\rceil \right\}$$

In one embodiment, if data is dropped, but CG-UCI is still transmitted and encoded separately with HARQ-ACK, then CG-UCI may be encoded as follows:

If CG-UCI is mapped first, then:

$$Q'_{CG-UCI} = \min\left\{\left\lceil \frac{(O_{CG-UCI} + L_{ACK}) \cdot \beta_{offset}^{PUSCH}}{R \cdot Q_m} \right\rceil, \left\lceil \alpha \cdot \sum_{l=l_0}^{N_{symb,all}^{PUSCH}-1} M_{sc}^{UCI}(l) \right\rceil \right\}$$

If CG-UCI is mapped after HARQ-ACK, then $$Q'_{CG-UCI} = \min\left\{\left\lceil \frac{(O_{CG-UCI} + L_{CG-UCI}) \cdot \beta_{offset}^{PUSCH} \cdot \sum_{l=l_0}^{N_{symb,all}^{PUSCH}-1} M_{sc}^{UCI}(l)}{\sum_{r=0}^{C_{UL-SCH}-1} K_r} \right\rceil,\right.$$

$$\left. \left\lceil \alpha \cdot \sum_{l=l_0}^{N_{symb,all}^{PUSCH}-1} M_{sc}^{UCI}(l) \right\rceil \right\}$$

In one embodiment, if data is dropped but CG-UCI is still transmitted and encoded separately with HARQ-ACK, then HARQ-ACK may be encoded as follows:

If HARQ-ACK is mapped first, then the legacy formula can be used.

If HARQ-ACK is mapped after CG-UCI, then:

$$Q'_{ACK} = \min\left\{\left\lceil \frac{(O_{ACK} + L_{ACK}) \cdot \beta_{offset}^{PUSCH} \cdot \sum_{l=l_0}^{N_{symb,all}^{PUSCH}-1} M_{sc}^{UCI}(l)}{\sum_{r=0}^{C_{UL-SCH}-1} K_r} \right\rceil,\right.$$

$$\left. \left\lceil \alpha \cdot \sum_{l=0}^{N_{symb,all}^{PUSCH}-1} M_{sc}^{UCI}(l) \right\rceil - Q'_{GC-UCI} \right\}$$

In one embodiment, if data is dropped but CG-UCI is still transmitted, the encoding for CSI part 1 may be done as follows:

If HARQ-ACK and CG-UCI are encoded together, then:
if there is CSI part 2 to be transmitted on the PUSCH:

$$Q'_{CSI-1} = \min\left\{\left\lceil\frac{(O_{CSI-1} + L_{CSI-1}) \cdot \beta^{PUSCH}_{offset}}{R \cdot Q_m}\right\rceil,\right.$$

$$\left.\left\lceil\alpha \cdot \sum_{l=0}^{N^{PUSCH}_{symb,all}-1} M^{UCI}_{sc}(l) - Q'_{CG-UCI+ACK}\right\rceil\right\}$$

else, if there is not a CSI part 2 to be transmitted:

$$Q'_{CSI-1} = \sum_{l=0}^{N^{PUSCH}_{symb,all}-1} M^{UCI}_{sc}(l) - Q'_{GC-UCI+ACK}$$

If HARQ-ACK and CG-UCI are encoded separately, then:
if there is CSI part 2 to be transmitted on the PUSCH:

$$Q'_{CSI-1} = \min\left\{\left\lceil\frac{(O_{CSI-1} + L_{CSI-1}) \cdot \beta^{PUSCH}_{offset}}{R \cdot Q_m}\right\rceil,\right.$$

$$\left.\left\lceil\alpha \cdot \sum_{l=0}^{N^{PUSCH}_{symb,all}-1} M^{UCI}_{sc}(l) - Q'_{CG-UCI} - Q'_{ACK}\right\rceil\right\}$$

else, if there is not a CSI part 2 to be transmitted:

$$Q'_{CSI-1} = \sum_{l=0}^{N^{PUSCH}_{symb,all}-1} M^{UCI}_{sc}(l) - Q'_{CG-UCI} - Q'_{ACK}$$

In one embodiment, if data is dropped but CG-UCI is still transmitted, the encoding for CSI part 2 may be done as follows:
If HARQ-ACK and CG-UCI are encoded together, then:

$$Q'_{CSI-2} = \sum_{l=0}^{N^{PUSCH}_{symb,all}-1} M^{UCI}_{sc}(l) - Q'_{CG-UCI+ACK} - Q'_{CSI-1}$$

If HARQ-ACK and CG-UCI are encoded separately, then:

$$Q'_{CSI-2} = \sum_{l=0}^{N^{PUSCH}_{symb,all}-1} M^{UCI}_{sc}(l) - Q'_{CG-UCI} - Q'_{ACK} - Q'_{CSI-1}$$

In one embodiment, if CG-UCI and other UCI types including CSI part 2 are multiplexed in CG PUSCH, depending on the amount of resources allocated for CSI part 2, some part of CSI part 2 may be dropped.

In particular, the calculation of an amount of resource for CSI part 2 can be done as follows: when the UE is scheduled to transmit a transport block on PUSCH multiplexed with a CSI report(s), Part 2 CSI is omitted only when $$\left\lceil(O_{CSI-2} + L_{CSI-2}) \cdot \beta^{PUSCH}_{offset} \cdot \sum_{l=0}^{N^{PUSCH}_{symb,all}-1} M^{UCI}_{sc}(l) / \sum_{r=0}^{C_{UL-SCH}-1} K_r\right\rceil$$

larger than:

$$\left\lceil\alpha \cdot \sum_{l=0}^{N^{PUSCH}_{symb,all}-1} M^{UCI}_{sc}(l)\right\rceil - Q'_{CG-UCI+ACK} - \sum_{l=0}^{N^{PUSCH}_{symb,all}-1} M^{UCI}_{sc}(l) -$$

$$Q'_{CG-UCI} - Q'_{ACK} - Q'_{CSI-1}$$

(if HARQ-ACK and CG-UCI are jointly encoded); or larger than $\lceil\alpha \cdot$ $$\left\lceil\alpha \cdot \sum_{l=0}^{N^{PUSCH}_{symb,all}-1} M^{UCI}_{sc}(l)\right\rceil - Q'_{CG-UCI} - Q'_{ACK} - Q'_{CSI-1}$$

(if HARQ-ACK and CG-UCI are encoded separately), where parameters $O_{CSI-2}$, $L_{CSI-2}$, $\beta^{PUSCH}_{offset}$, $N^{PUSCH}_{symb,all}$, $M^{UCI}_{sc}(l)$, $C_{UL-SCH}$, $K_r$, $Q'_{CSI-1}$, $Q'_{ACK}$ and $\alpha$ are defined in section 6.3.2.4 of [5, TS 38.212], or as provided above.

In one embodiment, Part 2 CSI is omitted level by level, beginning with the lowest priority level, until the lowest priority level is reached, which causes $$\left\lceil(O_{CSI-2} + L_{CSI-2}) \cdot \beta^{PUSCH}_{offset} \cdot \sum_{l=0}^{N^{PUSCH}_{symb,all}-1} M^{UCI}_{sc}(l) / \sum_{r=0}^{C_{UL-SCH}-1} K_r\right\rceil$$

to be less than or equal to:

$$\left\lceil\alpha \cdot \sum_{l=0}^{N^{PUSCH}_{symb,all}-1} M^{UCI}_{sc}(l)\right\rceil - Q'_{CG-UCI+ACK} - Q'_{CSI-1}$$

(if HARQ-ACK and CG-UCI are jointly encoded); or $$\left\lceil\alpha \cdot \sum_{l=0}^{N^{PUSCH}_{symb,all}-1} M^{UCI}_{sc}(l)\right\rceil - Q'_{CG-UCI} - Q'_{ACK} - Q'_{CSI-1}$$

(if HARQ-ACK and CG-UCI are encoded separately).

Operation Flows and Algorithmic Structures

Figure 4:
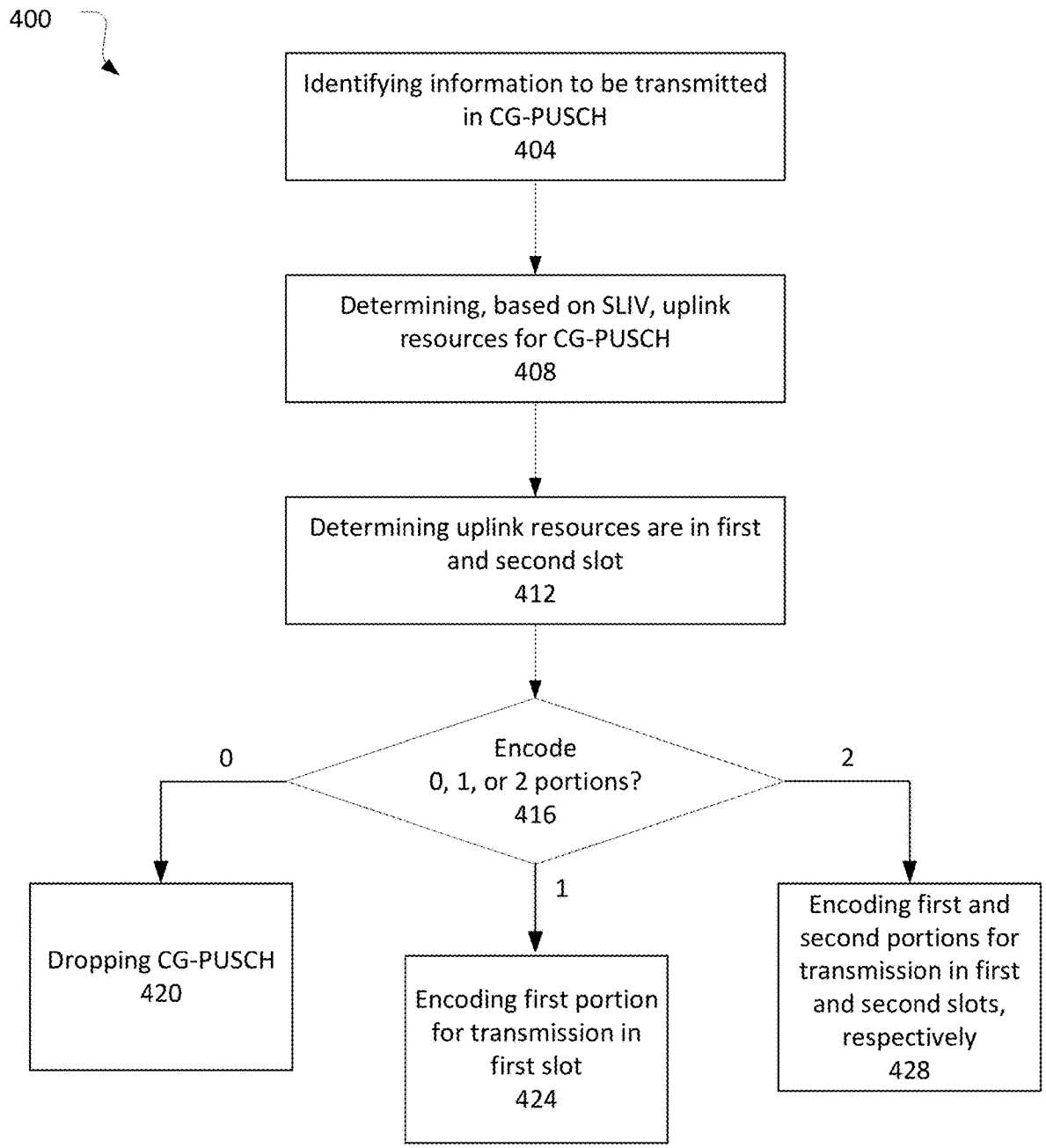
FIG. 4 illustrates an operation flow/algorithmic structure in accordance with some embodiments.
Figure 5:
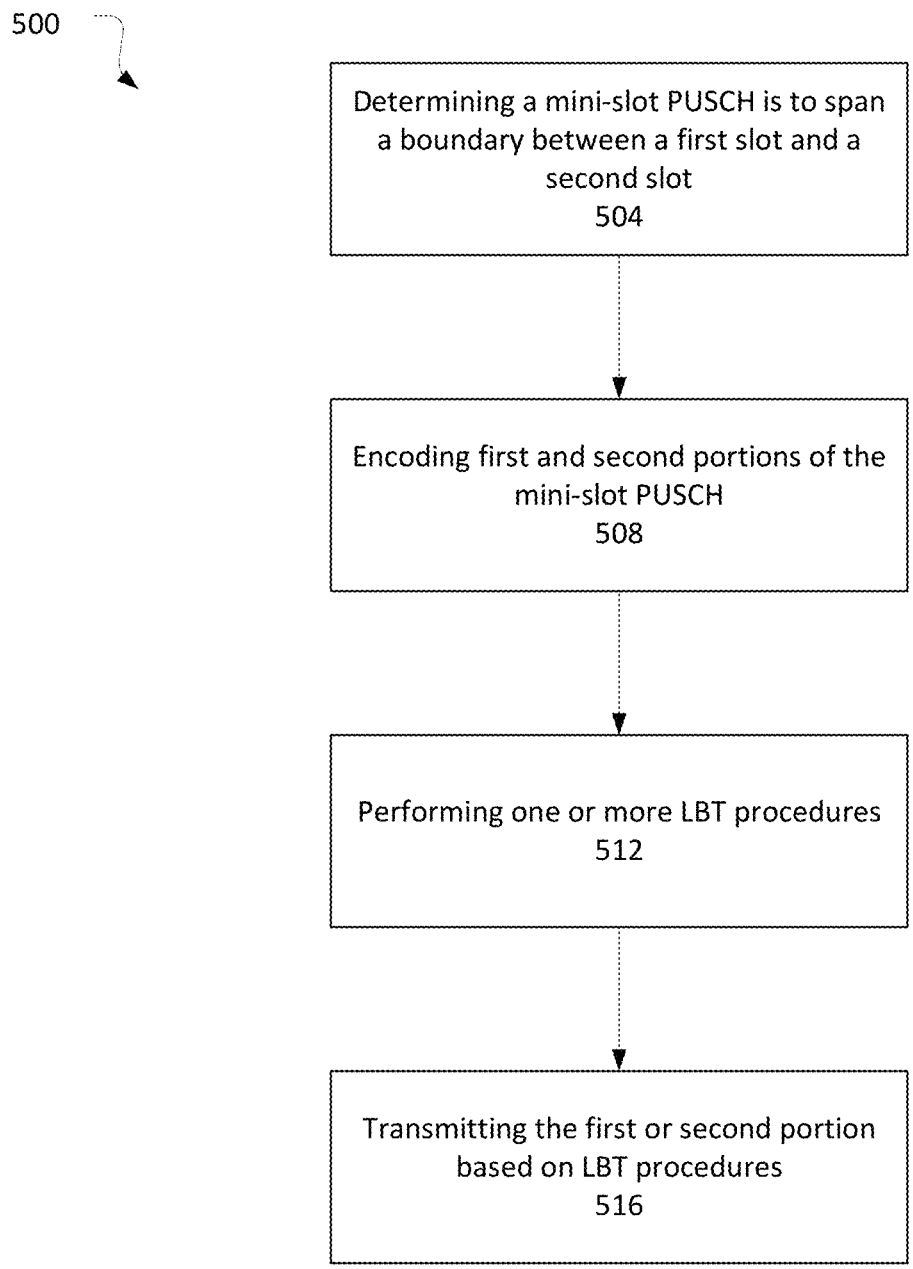
FIG. 5 illustrates an operation flow/algorithmic structure in accordance with some embodiments.

Aspects of the embodiments described herein may be implemented through devices or components performing operation flows/algorithmic structures. FIGS. 3-5 illustrate some operation flows/algorithmic structures in accordance with some embodiments. Some or all of the details of FIGS. 3-5 may be performed by UEs, for example, UEs 601a or 601b of FIG. 6; components, for example, baseband circuitry 710 or radio front end module 715 of FIG. 7; or processors 910 and memory/storage devices 920 of FIG. 9.

FIG. 3 illustrates an operation flow/algorithmic structure 300 in accordance with some embodiments.

The operation flow/algorithmic structure 300 may include, at 304, determining a CG-PUSCH is to be transmitted in a mini-slot. In some embodiments, the determination at 304 may include an initial determination of CG resources that are available to use. This initial determination may include processing configuration information received from a gNB using, for example, radio resource control (RRC) signaling.

In some embodiments, the gNB may configure a UE with type 1 CG allocation or type 2 CG allocation. Type 1 CG allocation may be fully configured and released using RRC signaling. Once configured, the UE may have a set of periodic opportunities for PUSCH transmission. The PDCCH may only be required when requesting a retransmission. With a type 2 CG allocation, the resource allocation may be partially configured using RRC signaling, but may be subsequently activated or deactivated using PDCCH transmissions.

In some embodiments, the gNB may also configure the UE to transmit the CG-PUSCH with a repetition. In some embodiments, the gNB may indicate a number of repetitions that the UE is to use through an RRC information element, for example, a PUSCH aggregation factor. This may part of, or separate from, the CG information.

After the UE determines the resources allocated for CG transmissions, the UE may identify information that is to be transmitted in an uplink transmission. The information may include data or control signals that are to be transmitted to a gNB in one or more physical channels such as, but not limited to, PUSCH, PUCCH, etc. In some embodiments, the information may include both grant-based information (for example, grant-based UCI) and CG information (for example, CG-UCI).

In some embodiments described herein, the UE may determine that a CG-PUSCH is to be transmitted in a boundary mini-slot, for example, a mini-slot that includes uplink resources (for example, OFDM symbols) in a plurality of slots. This determination may be based on a SLIV that may be configured by the CG configuration information received from the gNB.

The operation flow/algorithmic structure 300 may further include, at 308, selecting UCI based on the determination of 304. The UCI selected at 308 may include grant-based UCI or the CG-UCI. For example, in some embodiments, the UCI selected may include the grant-based UCI without the CG-UCI; the CG-UCI without the grant-based UCI; or both the grant-based UCI and the CG-UCI.

Selection of the UCI may be based on any of a number of factors including, but not limited to, mapping type used to map the PUSCH to the OFDM symbols (for example, Type-A or Type-B mapping type); or whether the mini-slot is a boundary or non-boundary mini-slot. If the mini-slot is a boundary mini-slot, the selecting of the UCI may further be based on an amount of uplink resources in the first slot as opposed to the second slot and the selecting may further include selecting the UCI (if any) to be transmitted in the first slot and selecting the UCI (if any) to be transmitted in the second slot. In some embodiments, the selecting of the UCI may additionally/alternatively be based on relative priorities of the different UCI as discussed herein.

The operation flow/algorithmic structure 300 may further include, at 312, encoding the CG-PUSCH with selected UCI for transmission in the mini-slot. In embodiments in which the CG-UCI is selected, the CG-UCI may be encoded with an indication of an SLIV or repetition that corresponds to a particular CG-PUSCH.

In some embodiments, the CG-PUSCH may be one of a plurality of PUSCHs of a CG burst that are to be transmitted in a respective plurality of mini-slots. The CG-PUSCHs may transmit the same information or different information. Some of the CG-PUSCHs may be transmitted in boundary mini-slots and others may be transmitted in non-boundary mini-slots. The selection of the UCI may be different for the CG-PUSCH based on whether the mini-slots are boundary or non-boundary. For example, as discussed elsewhere hemin, in some embodiments, CG-PUSCH transmitted in the boundary mini-slots may not include CG-UCI.

FIG. 4 illustrates an operation flow/algorithmic structure 400 in accordance with some embodiments.

The operation flow/algorithmic structure 400 may include, at 404, identifying information that is to be transmitted in a CG-PUSCH In some embodiments, upper layers of a UE may provide lower layers of a UE, for example, media access control (MAC)/physical (PHY) layer of the UE with information, for example, data or control information, to be transmitted. The lower layers of the UE may identify this information as information to be transmitted in the CG-PUSCH. Among other information, the information to be transmitted may include grant-based UCI or CG-UCI.

The operation flow/algorithmic structure 400 may further include, at 408, determining uplink resources that are to be used for the CG-PUSCH. The determining at 408 may be based on SLIV configured through a CG configuration information provided to the UE from gNB. Thus, the uplink resources may correspond to the configured grant resources and, in some embodiments, may include a plurality of CGs of a CG burst.

The operation flow/algorithmic structure 400 may further include, at 412, determining the uplink resources are in a first and a second slot. For example, the uplink resources may correspond to a mini-slot that has a time allocation that spans a slot boundary. The determining at 412 may be based on S and L values from the configured SLIV being greater than 14 in cases of normal cyclic prefix, for example.

The operation flow/algorithmic structure 400 may further include, at 416, determining whether to encode zero, one, or two portions. In various embodiments, the determining at 416 may be based at least in part on a size of the resource allocations in the first slot, for example, number of OFDM symbols available in the first slot.

In some embodiments, the determining at 416 may include determining to encode zero portions. In some embodiments, the UE may determine to encode zero portions if, for example, the uplink resources included in the first slot are not sufficient to transmit both a DMRS and a CG-UCI. For example, the UE may determine that no portions of the CG-PUSCH are to be encoded if the DMRS and the CG-UCI need more symbols than that available in the first slot.

If, at 416, it is determined to encode zero portions, the operation flow/algorithmic structure 400 may include, at 420, dropping the CG-PUSCH.

In some embodiments, the determining at 416 may include determining to encode one portion of the CG-PUSCH in uplink resources in the first slot (and puncture the second portion). In some embodiments, the UE may determine to puncture the second portion based at least in part on the size of the resource allocations in the second slot. For example, if the number of symbols included in the second slot is insufficient to carry a DMRS and CG-UCI, the second portion may be punctured.

If, at 416, it is determined to encode the first portion, the operation flow/algorithmic structure 400 may include, at 424, encoding the first portion for transmission in the first slot.

In some embodiments, the determining at 416 may include determining to encode two portions of the CG-PUSCH in uplink resources in the first slot and the second slot. The UE may decide to encode two portions based at least in part and size of the resources in the first and second slots. For example, if the mini-slot includes sufficient symbols in both the first and second slots to, for example, transmit DMRS and CG-UCI in both slots, the UE may determine to encode two portions.

If, at 416, it is determined to encode both portions, the operation flow/algorithmic structure 400 may include, at 428, encoding the first portion and second portion for transmission in first and second slots, respectively.

In various embodiments, the determining at 416 may also include determining what to encode in the first or second portions. For example, in embodiments in which two portions are to be encoded, the UE may determine which parts of the CG-PUSCH are to be encoded in the first portion and which parts are to be encoded in the second portion. This may include breaking up the CG-PUSCH into the two portions (or "repetitions" in some embodiments), with the first portion mapped to the symbols at the end of the first slot and a second portion mapped to the symbols at a beginning of the second slot. In some embodiments, each portion may include a front-loaded DMRS, with a CG-UCI mapped to each portion following the DMRS. The CG-UCI of each portion may include a SLIV that provides S and L values that correspond to the respective CG-UCI. For example, the S value of the CG-UCI transmitted in the first slot may indicate the starting symbol of the first slot, which may include the DMRS and be toward the end of the slot. The S value of the CG-UCI transmitted in the second slot may indicate the starting symbol of the second slot, which may also include a DMRS and may be the first slot, for example, OS #0. The sum of the two L values of the two portions may equal the L value configured to the UE for the total size of the uplink resource allocation, for example, the mini-slot.

FIG. 5 illustrates an operation flow/algorithmic structure 500 in accordance with some embodiments.

The operation flow/algorithmic structure 500 may include, at 504, determining a mini-slot PUSCH is to span a boundary between a first slot and a second slot in some embodiments, the determining that the mini-slot PUSCH spans the boundary may be based on the UE selecting CG uplink resources for transmission of a PUSCH. The selected resources may correspond to a configured mini-slot that has a starting symbol later in a first symbol and a length that causes at least some of the symbols of the mini-slot to occur in a second slot that follows the first.

The operation flow/algorithmic structure 500 may further include, at 508, encoding first and second portions of the mini-slot PUSCH. In some embodiments, the UE may determine which portions of the UCI and information are to be encoded in each of the portions. For example, the UE may determine whether CG-UCI, grant-based UCI, DMRS, or data is to be included in the first portion, the second portion, or both the first and second portions.

The operation flow/algorithmic structure 500 may include, at 512, performing one or more LBT procedures. To perform an LBT procedure, the UE may first perform a clear channel assessment (CCA) by listening on an operating channel for a period of time that corresponds to a CCA observation time. If the UE detects energy on the channel over a predetermined threshold, the UE may determine a backoff period based on a random value multiplied by the CCA observation time. After the backoff period the UE may again attempt a CCA. If the channel is occupied for more than a predetermined number of CCAs, the LBT procedure may be considered unsuccessful. If the UE determines the energy detected through the CCA observation time does not exceed the predetermined threshold, the LBT procedure may be considered successful.

In some embodiments, the LBT procedure may be performed for only the first portion. For example, if the LBT procedure is performed successfully for the first portion, the UE may be able to transmit both the first portion and the second portion. Alternatively, if the LBT procedure is unsuccessful, the UE may drop both the first and second portion.

In other embodiments, the LBT procedure may also be performed for the second portion. For example, if the LBT procedure is unsuccessful for the first portion, the first portion may be dropped but another LBT procedure may be performed for the second portion. If the second LBT procedure is successful, then the UE may send the second portion.

The operation flow/algorithmic structure 500 may include, at 516, transmitting the first or second portions based on the LBT procedures performed at 512.

Systems and Implementations

Figure 6:
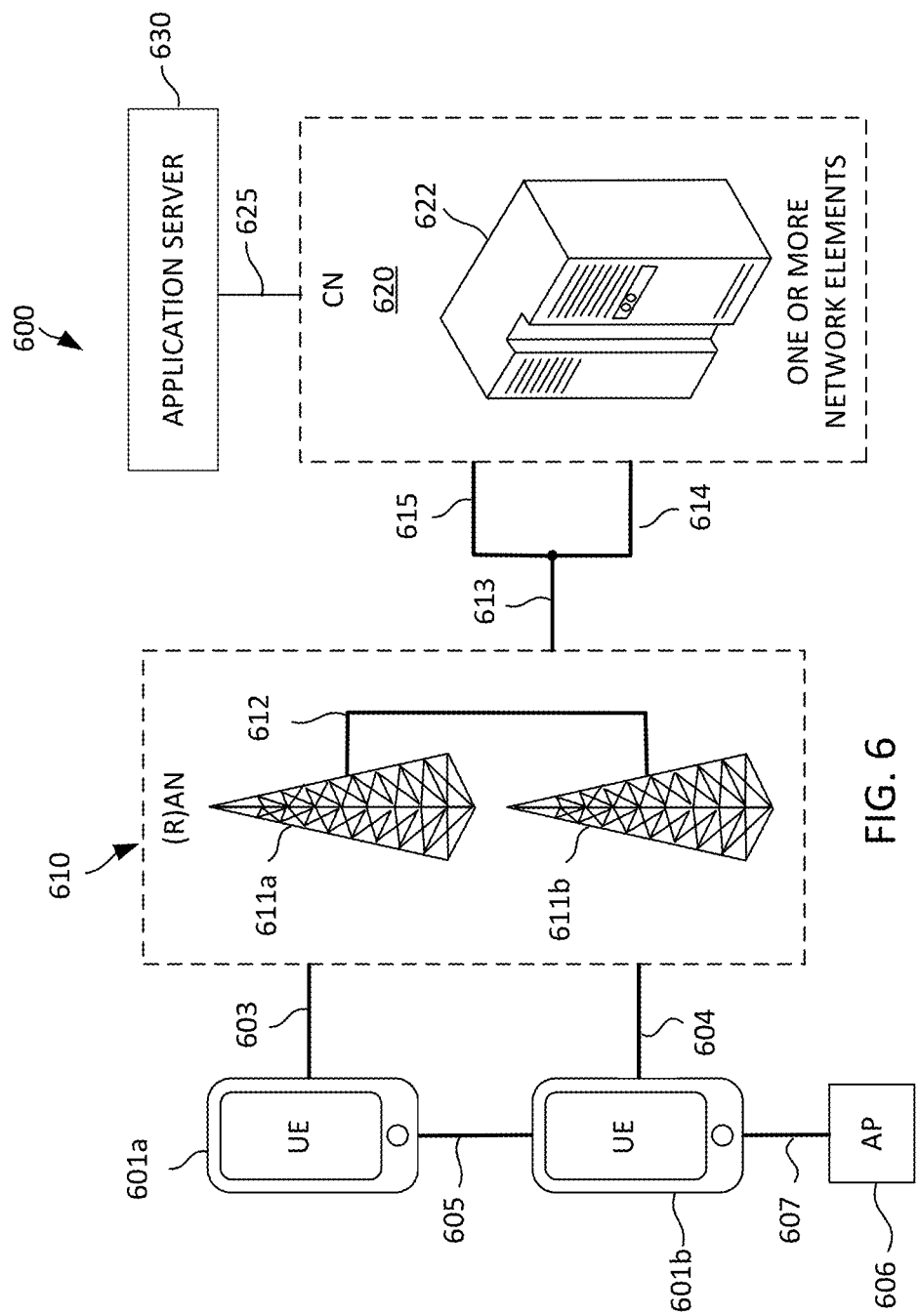
FIG. 6 illustrates an example architecture of a system in accordance with some embodiments.

Turning now to FIG. 6, an example architecture of a system 600 of a network is illustrated, in accordance with various embodiments. The following description is provided for an example system 600 that operates in conjunction with 5G or NR system standards as provided by 3GPP technical specifications, for example. However, the example embodiments are not limited in this regard, and the described embodiments may apply to other networks that benefit from the principles described herein, such as future 3GPP systems (e.g., Sixth Generation (6G)) systems or other wireless networks.

As shown by FIG. 6, the system 600 includes UE 601*a* and UE 601*b* (collectively referred to as "UEs 601"). In this example, UEs 601 are illustrated as smartphones (e.g., handheld touchscreen mobile computing devices connectable to one or more cellular networks) but may also 2o comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 601 may be Internet of Things (IoT) UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 may be configured to connect, for example, communicatively couple, with a Radio Access Network (RAN) 610. In embodiments, the RAN 610 may be an NO RAN or a 5G RAN. As used herein, the term "NO RAN" or the like may refer to a RAN 610 that operates in an NR or 5G system 600. The UEs 601 utilize connections (or channels) 603 and 604, respectively, each of which comprises a physical communications interface or layer (discussed in further detail below).

In this example, the connections 603 and 604 are illustrated as an air interface to enable communicative coupling, and can be consistent with cellular communications protocols, such as a 3GPP 5G/NR protocol or any of the other communications protocols discussed herein. In embodiments, the UEs 601 may directly exchange communication data via a ProSe interface 605. The ProSe interface 605 may alternatively be referred to as a sidelink (SL) interface 605.

The UE 601*b* is shown to be configured to access an AP 606 (also referred to as "WLAN node 606," "WLAN 606," "WLAN Termination 606," "WT 606" or the like) via connection 607. The connection 607 can comprise a local wireless connection, such as a connection consistent with any IEEE 802.11 protocol, wherein the AP 606 would comprise a wireless fidelity (Wi-Fi®) router. In this example, the AP 606 is shown to be connected to the Internet without connecting to the core network of the wireless system (described in further detail below). In various embodiments, the UE 601*b*, RAN 610, and AP 606 may be configured to utilize LWA operation and/or LWIP operation. The LWA operation may involve the UE 601*b* in RRC_CONNECTED being configured by a RAN node 611*a-b* to utilize radio resources of LTE and WLAN. LWIP operation may involve the UE 601*b* using WLAN radio resources (e.g., connection 607) via IPec protocol tunneling to authenticate and encrypt packets (e.g., IP packets) sent over the connection 607. IPsec tunneling may include encapsulating the entirety of original IP packets and adding a new packet header, thereby protecting the original header of the IP packets.

The RAN 610 can include one or more access nodes (ANs) or RAN nodes 611*a* and 611*b* (collectively referred to as "RAN nodes 611") that enable the connections 603 and 604. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 611 that operates in an NR or 5G system 600 (for example, a gNB), and the term "E-UTRAN node" or the like may refer to a RAN node 611 that operates in an LTE or 4G system (e.g., an eNB). According to various embodiments, the RAN nodes 611 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In vehicle-to-everything (V2X) scenarios one or more of the RAN nodes 611 may be or act as a road-side unit (RSU). An RSU may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 601 (vUEs) The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 611 can terminate the air interface protocol and can be the first point of contact for the UEs 601. In some embodiments, any of the RAN nodes 611 can fulfill various logical functions for the RAN 610 including, but not limited to, radio network controller (RNC) functions such as radio bearer management, uplink and downlink dynamic radio resource management and data packet scheduling, and mobility management.

In embodiments, the UEs 601 can be configured to communicate using OFDM communication signals with each other or with any of the RAN nodes 611 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 to the UEs 601, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 601 and the RAN nodes 611 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band").

To operate in the unlicensed spectrum, the UEs 601 and the RAN nodes 611 may operate using LAA, eLAA, and/or feLAA mechanisms. In these implementations, the UEs 601 and the RAN nodes 611 may perform one or more known medium-sensing operations and/or a carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

As discussed above, LBT is a mechanism whereby equipment (for example, UES 601 RAN nodes 611, etc.) senses a medium (for example, a channel or carrier frequency) and transmits when the medium is sensed to be idle (or when a specific channel in the medium is sensed to be unoccupied). The medium sensing operation may include CCA, which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RP energy to a predefined or configured threshold.

The RAN nodes 611 may be configured to communicate with one another via interface 612. The interface 612 may be an Xn interface 612. The Xn interface is defined between two or more RAN nodes 611 (e.g., two or more gNBs and the like) that connect to 5° C. 620, between a RAN node 611 (e.g., a gNB) connecting to 5GC 620 and an eNB, and/or between two eNBs connecting to 5GC 620. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 601 in a connected mode (e.g., CM-CONNECTED) including functionality to manage the UE mobility for connected mode between one or more RAN nodes 611. The mobility support may include context transfer from an old (source) serving RAN node 611 to new (target) serving RAN node 611; and control of user plane tunnels between old (source) serving RAN node 611 to new (target) serving RAN node 611. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 610 is shown to be communicatively coupled to a core network—in this embodiment, core network (CN) 620. The CN 620 may comprise a plurality of network elements 622, which are configured to offer various data and telecommunications services to customers/subscribers (e.g., users of UEs 601) who are connected to the CN 620 via the RAN 610. The components of the CN 620 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 620 may be referred to as a network slice, and a logical instantiation of a portion of the CN 620 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 630 may be an element offering applications that use IP bearer resources with the core network (e.g., UNITS PS domain, LTE PS data services, etc.). The application server 630 can also be configured to support one or more communication services (e.g., VoIP sessions, PTT sessions, group communication sessions, social networking services, etc.) for the UEs 601 via the CN 620.

In embodiments, the CN 620 may be a 5GC (referred to as "5GC 620" or the like), and the RAN 610 may be connected with the CN 620 via an NO interface 613. In embodiments, the NG interface 613 may be split into two parts, an NG user plane (NG-U) interface 614, which carries traffic data between the RAN nodes 611 and a UPF, and the S1 control plane (NG-C) interface 61S, which is a signaling interface between the RAN nodes 611 and AMFs.

Figure 7:
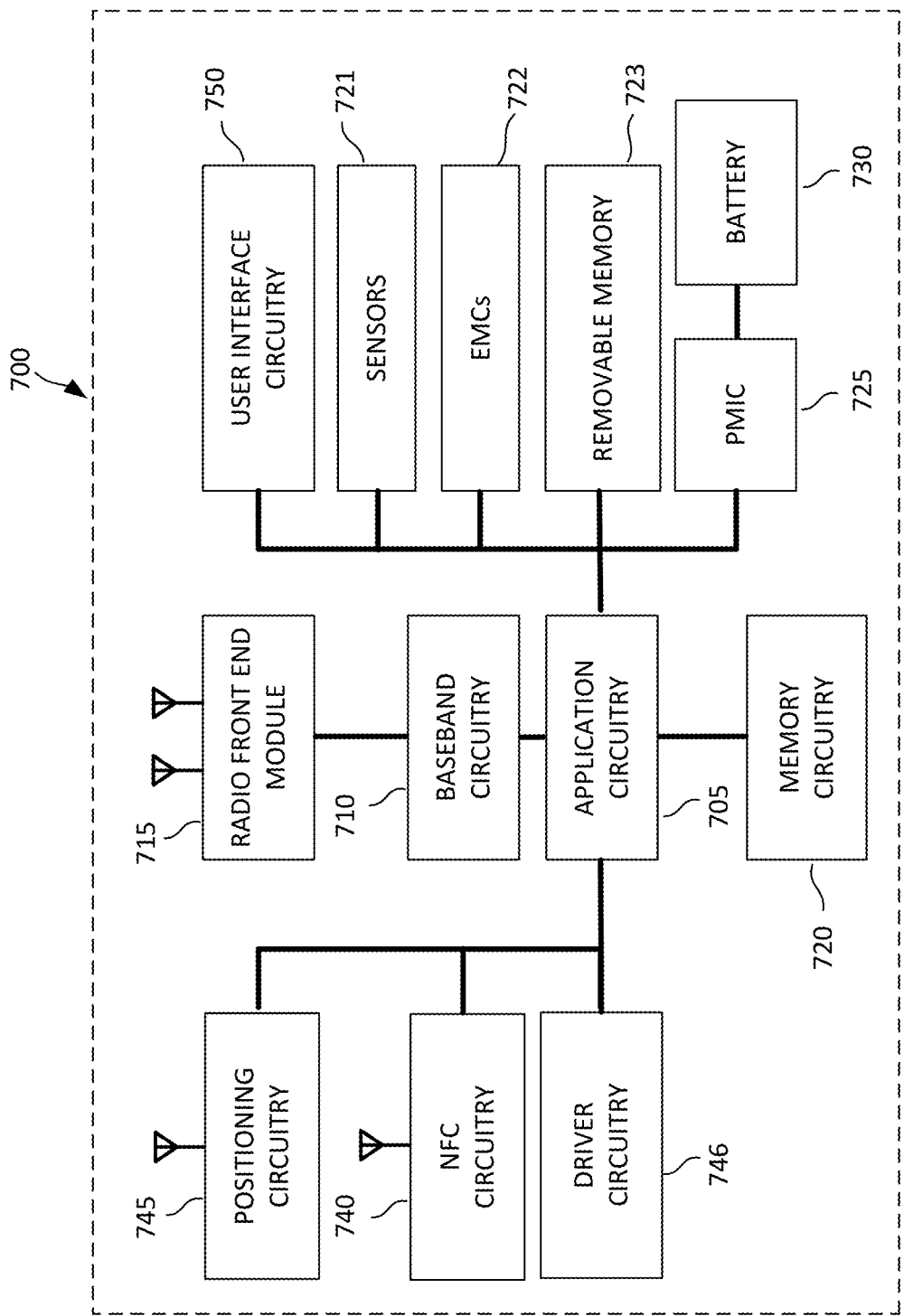
FIG. 7 illustrates an example of a platform (or "device") in accordance with some embodiments.

FIG. 7 illustrates an example of a platform 700 (or "device 700") in accordance with various embodiments. In embodiments, the computer platform 700 may be suitable for use as UEs 601 and/or any other element/device discussed herein. The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in other implementations.

Application circuitry 705 includes circuitry such as, but not limited to one or more processors (or processor cores), cache memory, and one or more of low-dropout regulators (LDOs), interrupt controllers, serial interfaces, universal programmable serial interface module, real-time clock (RTC), timer-counters including interval and watchdog timers, general purpose I/O, memory card controllers such as secure digital multi-media card (SD MMC) or similar, universal serial bus (USB) interfaces, mobile industry processor interface (MIPI®) interfaces, and joint test action group (JTAG) test access ports. The processors (or cores) of the application circuitry 605 may be coupled with or may include memory/storage elements and may be configured to execute instructions stored in the memory/storage to enable various applications or operating systems to run on the system 600. In some implementations, the memory/storage elements may be on-chip memory circuitry, which may include any suitable volatile and/or non-volatile memory, such as dynamic random access memory (DRAM), static random access memory (SRAM), eraseable programmable read-only memory (EPROM), electrically EPROM (EEPROM), Flash memory, solid-state memory, and/or any other type of memory device technology, such as those discussed herein.

The processor(s) of application circuitry 705 may include, for example, one or more processor cores, one or more application processors, one or more graphic processing units (GPUs), one or more reduced instruction set computer (RISC) processors, one or more Arm processors, one or more complex instruction set computer (CISC) processors, one or more digital signal processors (DSPs), one or more field programmable gate arrays (FPGAs), one or more programmable logic devices (PLDs), one or more application specific integrated circuits (ASICs), one or more microprocessors or controllers, a multithreaded processor, an ultra-low voltage processor, an embedded processor, some other known processing element, or any suitable combination thereof. In some embodiments, the application circuitry 705 may comprise, or may be, a special-purpose processor/controller to operate according to the various embodiments herein.

As examples, the processor(s) of application circuitry 705 may include an Intel® Architecture Core® based processor, such as a Quark™, an Atom™, an i3, an i5, an i7, or an MCU-class processor, or another such processor available from Intel® Corporation, Santa Clara, CA. The processors of the application circuitry 705 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, WarriorI-class, and Warrior P-class processors; an Arm-based design licensed from ARM Holdings, Ltd., such as the ARM Cortex-A, Cortex-R, and Cortex-M family of processors; or the like. In some implementations, the application circuitry 705 may be a part of a system on a chip (SoC) in which the application circuitry 705 and other components are formed into a single integrated circuit, or a single package, such as the Edison™ or Galileo™ SoC boards from Intel® Corporation.

Additionally or alternatively, application circuitry 705 may include circuitry such as, but not limited to, one or more a field-programmable devices (PPDs) such as PGAs and the like; PLDs such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells such as EPROM, EEPROM, flash memory, static memory (e.g., static random access memory (SRAM), anti-fuses, etc.)) used to store logic blocks, logic fabric, data, etc. in look-up tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 710 are discussed infra with regard to FIG. 8.

The radio front end module (RFEM) 715, which may also be referred to as "radio front end circuitry," may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 811 of FIG. 8 infra), and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include any number and type of memory devices used to provide for a given amount of system memory. As examples, the memory circuitry 720 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 720 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 720 may be on-die memory or registers associated with the application circuitry 705. To provide for persistent storage of information such as data, applications, operating systems and so forth, memory circuitry 720 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 700 may incorporate the three-dimensional (3D) cross-point (XPOINT) memories from Intel® and Micron®.

Removable memory circuitry 723 may include devices, circuitry, enclosures/housings, ports or receptacles, etc. used to couple portable data storage devices with the platform 700. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 700 may also include interface circuitry (not shown) that is used to connect external devices with the platform 700. The external devices connected to the platform 600 via the interface circuitry include sensor circuitry 721 and electro-mechanical components (EMCs) 722, as well as removable memory devices coupled to removable memory circuitry 723.

The sensor circuitry 721 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 722 include devices, modules, or subsystems whose purpose is to enable platform 700 to change its state, position, and/or orientation, or move or control a mechanism or (sub)system. Additionally, EMCs 722 may be configured to generate and send messages/signaling to other components of the platform 700 to indicate a current state of the EMCs 722. Examples of the EMCs 722 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 700 is configured to operate one or more EMCs 722 based on one or more captured events and/or instructions or control signals received from a service provider and/or various clients.

In some implementations, the interface circuitry may connect the platform 700 with positioning circuitry 745. The positioning circuitry 745 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-PNT IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various infrastructure (e.g., radio base stations), for turn-by-turn navigation applications, or the like In some implementations, interface circuitry may connect the platform 700 with Near-Field Communication (NFC) circuitry 740. NFC circuitry 740 is configured to provide contactless, short-range communications based on radio frequency identification (RFID) standards, wherein magnetic field induction is used to enable communication between NFC circuitry 740 and NFC-enabled devices external to the platform 700 (e.g., an "NFC touchpoint"). NFC circuitry 740 comprises an NFC controller coupled with an antenna element and a processor coupled with the NFC controller. The NFC controller may be a chip/IC providing NFC functionalities to the NFC circuitry 740 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 640, or initiate data transfer between the NFC circuitry 640 and another active NFC device (e.g., a smartphone or an NFC-enabled POS terminal) that is proximate to the platform 700.

The driver circuitry 746 may include software and hardware elements that operate to control particular devices that are embedded in the platform 700, attached to the platform 700, or otherwise communicatively coupled with the platform 700. The driver circuitry 746 may include individual drivers allowing other components of the platform 700 to interact with or control various input/output (I/O) devices that may be present within, or connected to, the platform 700. For example, driver circuitry 746 may include a display driver to control and allow access to a display device, a touchscreen driver to control and allow access to a touchscreen interface of the platform 700, sensor drivers to obtain sensor readings of sensor circuitry 721 and control and allow access to sensor circuitry 721, EMC drivers to obtain actuator positions of the EMCs 722 and/or control and allow access to the EMCs 722, a camera driver to control and allow access to an embedded image capture device, audio drivers to control and allow access to one or more audio devices.

The power management integrated circuitry (PMIC) 725 (also referred to as "power management circuitry 725") may manage power provided to various components of the platform 700. In particular, with respect to the baseband circuitry 710, the PMIC 725 may control power-source selection, voltage scaling, battery charging, or DC-to-DC conversion. The PMIC 725 may often be included when the platform 700 is capable of being powered by a battery 730, for example, when the device is included in a UE 601.

In some embodiments, the PMIC 725 may control, or otherwise be part of, various power saving mechanisms of the platform 700. For example, if the platform 700 is in an RRC_Connected state, where it is still connected to the RAN node as it expects to receive traffic shortly, then it may enter a state known as Discontinuous Reception Mode (DRX) after a period of inactivity. During this state, the platform 700 may power down for brief intervals of time and thus save power. If there is no data traffic activity for an extended period of time, then the platform 700 may transition off to an RRC_Idle state, where it disconnects from the network and does not perform operations such as channel quality feedback, handover, etc. The platform 700 goes into a very low power state and it performs paging where again it periodically wakes up to listen to the network and then powers down again. The platform 700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 730 may power the platform 700, although in some examples the platform 700 may be mounted deployed in a fixed location, and may have a power supply coupled to an electrical grid. The battery 730 may be a lithium ion battery, a metal-air battery, such as a zinc-air battery, an aluminum-air battery, a lithium-air battery, and the like. In some implementations, such as in V2X applications, the battery 730 may be a typical lead-acid automotive battery.

In some implementations, the battery 730 may be a "smart battery," which includes or is coupled with a Battery Management System (BMS) or battery monitoring integrated circuitry. The BMS may be included in the platform 600 to track the state of charge (SoCh) of the battery 730. The BMS may be used to monitor other parameters of the battery 730 to provide failure predictions, such as the state of health (SoH) and the state of function (SoF) of the battery 730. The BMS may communicate the information of the battery 730 to the application circuitry 705 or other components of the platform 700. The BMS may also include an analog-to-digital (ADC) convertor that allows the application circuitry 705 to directly monitor the voltage of the battery 730 or the current flow from the battery 730. The battery parameters may be used to determine actions that the platform 700 may perform, such as transmission frequency, network operation, sensing frequency, and the like.

A power block, or other power supply coupled to an electrical grid may be coupled with the BMS to charge the battery 730. In some examples, the power block may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 750 includes various input/output (I/O) devices present within, or connected to, the platform 700, and includes one or more user interfaces designed to enable user interaction with the platform 700 and/or peripheral component interfaces designed to enable peripheral component interaction with the platform 700. The user interface circuitry 750 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator a position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 700. The output device circuitry may also include speakers or other audio emitting devices, printer(s), and/or the like. In some embodiments, the sensor circuitry 721 may be used as the input device circuitry (e.g., an image capture device, motion capture device, or the like) and one or more EMCs may be used as the output device circuitry (e.g., an actuator to provide haptic feedback or the like). In another example, NPC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 700 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/TX may be a proprietary bus/IX, for example, used in a SoC based system. Other bus/IX systems may be included, such as an I2C interface, an SPI interface, point-to-point interfaces, and a power bus, among others.

Figure 8:
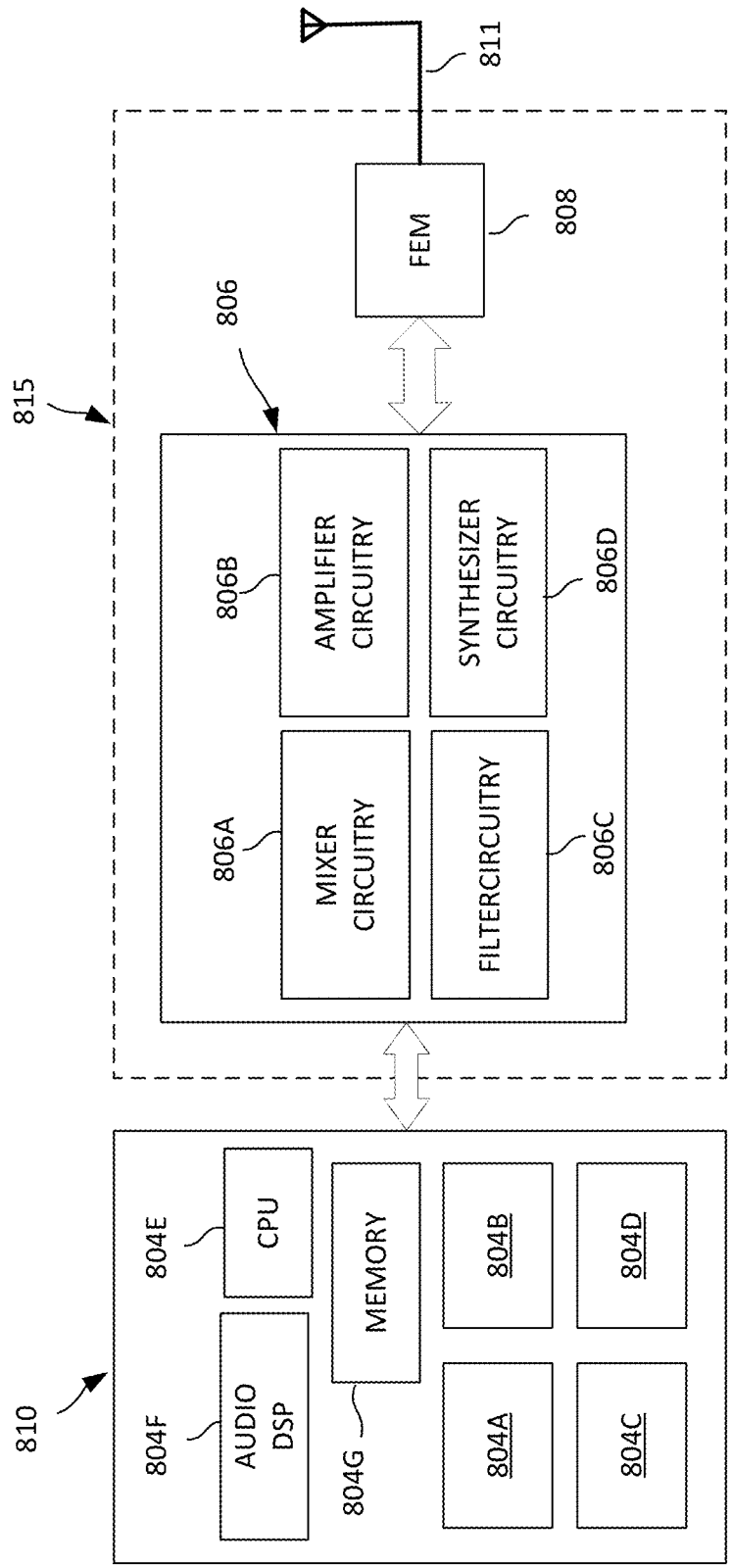
FIG. 8 illustrates example components of baseband circuitry and radio front end modules in accordance with some embodiments.

FIG. 8 illustrates example components of baseband circuitry 810 and radio front end modules (RFEM) 815 in accordance with various embodiments. The baseband circuitry 810 corresponds to the baseband circuitry 710 of FIG. 7 with like-named components corresponding to one another.

The baseband circuitry 810 includes circuitry and/or control logic configured to carry out various radio/network protocol and radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 810 may include Fast-Fourier Transform (FFT), precoding, or constellation mapping/demapping functionality. In some embodiments, encoding/decoding circuitry of the baseband circuitry 810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 810 is configured to process baseband signals received from a receive signal path of the RF circuitry 806 and to generate baseband signals for a transmit signal path of the RF circuitry 806. The baseband circuitry 810 is configured to interface with application circuitry 705 (see FIG. 7) for generation and processing of the baseband signals and for controlling operations of the RF circuitry 806. The baseband circuitry 810 may handle various radio control functions.

The aforementioned circuitry and/or control logic of the baseband circuitry 810 may include one or more single or multi-core processors. For example, the one or more processors may include a 3G baseband processor 804A, a 4G/LTE baseband processor 804B, a 5G/NR baseband processor 804C, or some other baseband processor(s) 804G for other existing generations, generations in development or to be developed in the future (e.g., sixth generation (6G), etc.). In other embodiments, some or all of the functionality of baseband processors 804A-D may be included in modules stored in the memory 8040 and executed via a Central Processing Unit (CPU) 804E. In other embodiments, some or all of the functionality of baseband processors 804A-D may be provided as hardware accelerators (e.g., FPGAs, ASICs, etc.) loaded with the appropriate bit streams or logic blocks stored in respective memory cells. In various embodiments, the memory 804G may store program code of a real-time operating system (RTOS), which when executed by the CPU 804E (or other baseband processor), is to cause the CPU 804E (or other baseband processor) to manage resources of the baseband circuitry 810, schedule tasks, etc. Examples of the RTOS may include Operating System Embedded (OSE)™ provided by Enea®, Nucleus RTOS® provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 810 includes one or more audio DSPs 804F. The audio DSPs 804F include elements for compression/decompression and echo cancellation and may include other suitable processing elements in other embodiments.

In some embodiments, each of the processors 804A-704E include respective memory interfaces to send/receive data to/from the memory 804G. The baseband circuitry 810 may further include one or more interfaces to communicatively couple to other circuitries/devices, such as an interface to send/receive data to/from memory external to the baseband circuitry 810; an application circuitry interface to send/receive data to/from the application circuitry 705 of FIG. 7; an RF circuitry interface to send/receive data to/from RF circuitry 806 of FIG. 8; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 725.

In alternate embodiments (which may be combined with the above described embodiments), baseband circuitry 810 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (e.g., the radio front end modules 815).

Although not shown by FIG. 8, in some embodiments, the baseband circuitry 810 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 810 and/or RF circuitry 806 are part of mmWave communication circuitry or some other suitable cellular communication circuitry. In the first example, the protocol processing circuitry would operate MAC, radio link control (RLC), packet data convergence protocol (PDCP), service data adaptation (SDAP), RRC, and non-access stratum (NAS) functions. The protocol processing circuitry may include one or more memory structures (e.g., 804G) to store program code and data for operating the protocol functions, as well as one or more processing cores to execute the program code and perform various operations using the data. The baseband circuitry 810 may also support radio communications for more than one wireless protocol.

The various hardware elements of the baseband circuitry 810 discussed herein may be implemented, for example, as a solder-down substrate including one or more integrated circuits (ICs), a single packaged IC soldered to a main circuit board or a multi-chip module containing two or more ICs. In one example, the components of the baseband circuitry 810 may be suitably combined in a single chip or chipset, or disposed on a same circuit board. In another example, some or all of the constituent components of the baseband circuitry 810 and RF circuitry 806 may be implemented together such as, for example, a system on a chip (SoC) or System-in-Package (SiP). In another example, some or all of the constituent components of the baseband circuitry 810 may be implemented as a separate SoC that is communicatively coupled with and RF circuitry 806 (or multiple instances of RF circuitry 806). In yet another example, some or all of the constituent components of the baseband circuitry 810 and the application circuitry 705 may be implemented together as individual SoCs mounted to a same circuit board (e.g., a "multi-chip package").

In some embodiments, the baseband circuitry 810 may provide for communication compatible with one or more radio technologies. For example, in some embodiments, the baseband circuitry 810 may support communication with an NG-RAN, E-UTRAN or other WMAN, a WLAN, a WPAN. Embodiments in which the baseband circuitry 810 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path, which may include circuitry to down-convert RFP signals received from the FEM circuitry 808 and provide baseband signals to the baseband circuitry 810. RF circuitry 806 may also include a transmit signal path, which may include circuitry to up-convert baseband signals provided by the baseband circuitry 810 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 810 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 810 and may be filtered by filter circuitry 80.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a of the transmit signal path may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output, baseband signals and the input baseband signals may be digital baseband signals. In these alternate embodiments, the RF circuitry 806 may include analog-to-digital converter (ADC) and digital-to-analog converter (DAC) circuitry and the baseband circuitry 810 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 810 or the application circuitry 505/605 depending on the desired output frequency. In some embodiments, a divider control input (e.g., N) may be determined from a look-up table based on a channel indicated by the application circuitry 505/605.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path, which may include circuitry configured to operate on RF signals received from antenna array 811, amplify the received signals and provide the amplified versions of the received signals to the RF circuitry 806 for further processing. FEM circuitry 808 may also include a transmit signal path, which may include circuitry configured to amplify signals for transmission provided by the RF circuitry 806 for transmission by one or more of antenna elements of antenna array 811L in various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission by one or more antenna elements of the antenna array 811.

The antenna array 811 comprises one or more antenna elements, each of which is configured convert electrical signals into radio waves to travel through the air and to convert received radio waves into electrical signals. For example, digital baseband signals provided by the baseband circuitry 810 is converted into analog RF signals (e.g., modulated waveform) that will be amplified and transmitted via the antenna elements of the antenna array 811 including one or more antenna elements (not shown). The antenna elements may be omnidirectional, direction, or a combination thereof. The antenna elements may be formed in a multitude of arranges as are known and/or discussed herein.

The antenna array 811 may comprise microstrip antennas or printed antennas that are fabricated on the surface of one or more printed circuit boards. The antenna array 811 may be formed in as a patch of metal foil (e.g., a patch antenna) in a variety of shapes, and may be coupled with the RF circuitry 806 and/or FEM circuitry 808 using metal transmission lines or the like.

Figure 9:
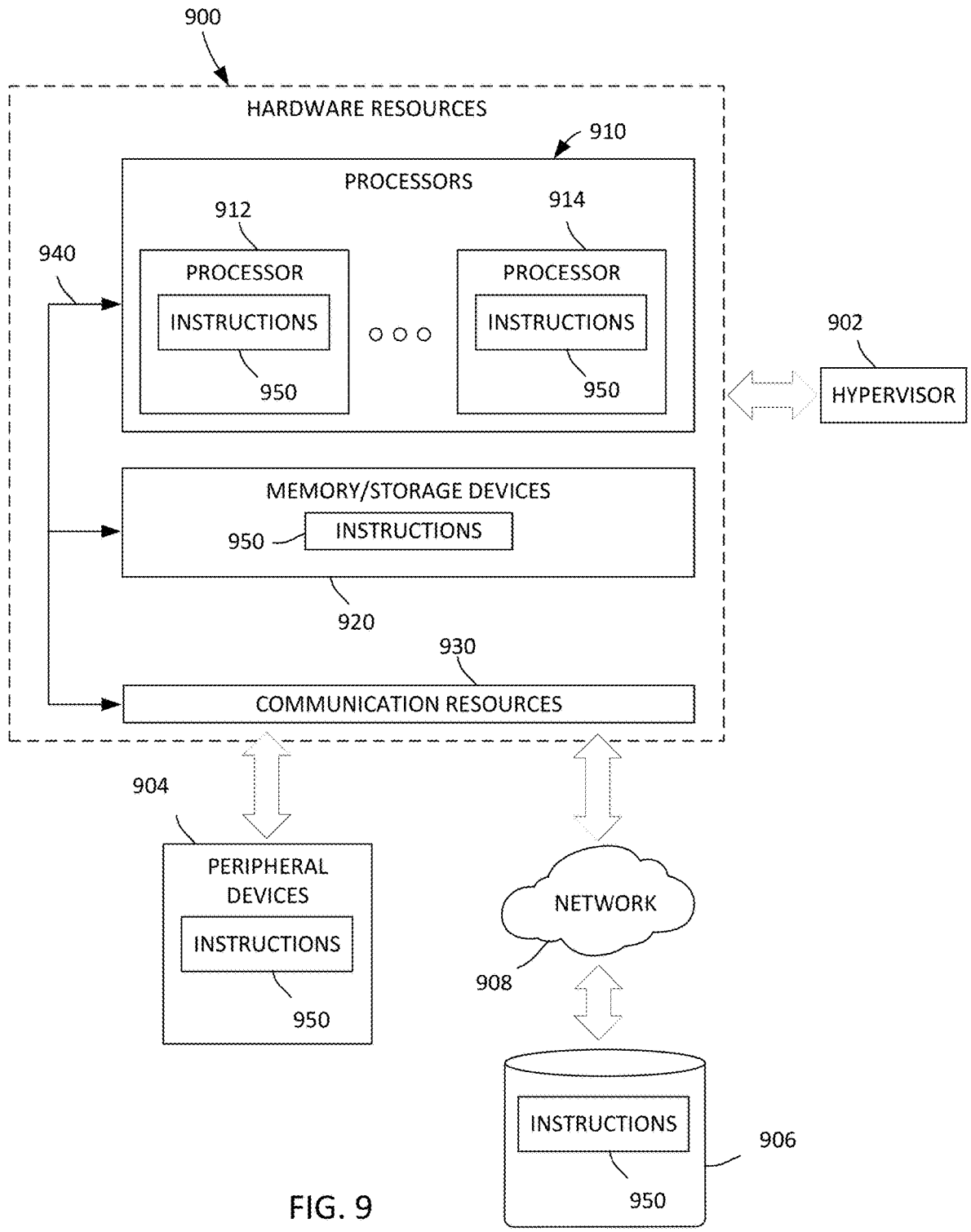
FIG. 9 is a block diagram illustrating components able to read instructions from a machine-readable or computer-readable medium and perform any one or more of the methodologies discussed herein in accordance with some embodiments.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900.

The processors 910 may include, for example, a processor 912 and a processor 914. The processor(s) 910 may be, for example, a CPU, a RISC processor, a CISC processor, a GPU, a DSP such as a baseband processor, an ASIC, an FPGA, a radio-frequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via USB), cellular communication components, NFC components, Bluetooth® (or Bluetooth® Low Energy) components, Wi-Fi® components, and other communication components.

Instructions 950 may comprise software, a program, an application, an applet, an app, or other executable code for causing at least any of the processor 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

In the following sections, further exemplary embodiments are provided.

Example 1 may include a method of operation a UE, the method comprising: determining a CG-PUSCH is to be transmitted in a mini-slot that includes a time allocation that spans across a slot boundary; selecting UCI to include grant-based UCI or CG-UCI based on mini-slot including the time allocation that spans across the slot boundary; and encoding the CG-PUSCH with the UCI to be transmitted in the mini-slot.

Example 2 may include the method of example 1 or some other example herein, wherein selecting the UCI further comprises: selecting the UCI to include the grant-based UCI without the CG-UCI based on the mini-slot including the time allocation that spans across the slot boundary.

Example 3 may include the method of example 1 or some other example herein, further comprising: encoding a plurality of CG-PUSCHs of a configured grant (CG) burst to be transmitted in a respective plurality of mini-slots, wherein CG-PUSCHs to be transmitted in mini-slots that do not include time allocations that span across slot boundaries are to include respective CG-UCIs and CG-PUSCHs to be transmitted in mini-slots that do include time allocations that span across slot boundaries are not to include respective CG-UCIs.

Example 4 may include the method of example 1 or some other example herein, wherein the CG-PUSCH is a first CG-PUSCH, the CG-UCI is a first CG-UCI, the mini-slot is a first mini-slot, and the method further comprises: encoding a second CG-PUSCH to be transmitted in a second mini-slot, the second CG-PUSCH to include a second CG-UCI that includes an indication of SLIV for the second mini-slot.

Example 5 may include the method of example 4 or some other example herein, wherein the SLIV is to indicate that the second CG-PUSCH starts at a first OFDM symbol, wherein the second CG-PUSCH starts at a second OFDM symbol that is a number of OFDM symbols after the first OFDM symbol, wherein the number of OFDM symbols corresponds to a length of a LBT gap that starts at the first OFDM symbol.

Example 6 may include the method of example 5 or some other example herein, further comprising: identifying a configured SLIV for the second CG-PUSCH, wherein both the SLIV and the configured SLIV are to indicate the second CG-PUSCH is to start at the first OFDM symbol.

Example 7 may include the method of example 4 or some other example herein, wherein the SLIV is to indicate that the second CG-PUSCH starts at a first OFDM symbol, wherein the second CG-PUSCH starts at the first OFDM symbol and a LBT gap ends at a second OFDM symbol that immediately-precedes the first OFDM symbol.

Example 8 may include the method of example 1 or some other example herein, wherein the CG-PUSCH is a first CG-PUSCH, the CG-UCI is a first CG-UCI, the mini-slot is a first mini-slot, and the method further comprises: encoding a second CG-PUSCH to be transmitted in a second mini-slot, the second CG-PUSCH to include a second CG-UCI that includes an indication of a repetition number corresponding to the second CG-PUSCH.

Example 9 may include the method of example 1 or some other example herein, further comprising: determining a type or duration of the CG-PUSCH; and selecting the UCI to include the grant-based UCI or the CG-UCI based on the type or duration of the CG-PUSCH.

Example 10 may include a method of operating a UE, the method comprising: identifying information to be transmitted in a configured grant—physical uplink shared channel (CG-PUSCH), the information to include grant-based UCI or CG-UCI; determining, based on starting symbol and length values, uplink resources for CG-PUSCH; determining the uplink resources are in a first slot and a second slot; encoding at least a portion of the information in a first portion of the CG-PUSCH; and transmitting the first portion of the CG-PUSCH in the first slot.

Example 11 may include the method of example 10 or some other example herein, further comprising: puncturing a second portion of the CG-PUSCH corresponding to uplink resources in the second slot.

Example 12 may include the method of example 10 or some other example herein, further comprising: mapping a DMRS to a first symbol that corresponds to the starting symbol and map the CG-UCI to a second symbol that immediately follows the first symbol, wherein the first and second symbols are in the first slot.

Example 13 may include the method of example 10 or some other example herein, wherein the CG-PUSCH is a first CG-PUSCH, the CG-UCI is a first CG-UCI, and the boundary is a first boundary, and the method further comprises: determining a second CG-PUSCH is to cross a second slot boundary between a third slot and a fourth slot; and dropping the second CG-PUSCH based on a determination that a number of symbols to transmit a demodulation reference signal (DMRS) and a second CG-UCI is greater than a number of available symbols in the third slot for transmission of a first portion of the second CG-PUSCH.

Example 14 may include the method of example 10 or some other example herein, further comprising: encoding at least another portion of the information in a second portion of the CG-PUSCH; and transmitting the second portion of the CG-PUSCH in the second slot.

Example 15 may include the method of example 10 or some other example herein, wherein the first portion of the CG-PUSCH includes a first CG-UCI that includes an indication of a first SLIV that corresponds to a first length of the first portion of the CG-PUSCH; the second portion of the CG-PUSCH includes a second CG-UCI that includes an indication of a second SLIV that corresponds to a second length of the second portion of the CG-PUSCH, and the length corresponding to the CG-PUSCH is equal to a sum of the first length and the second length.

Example 16 may include the method of example 14 or some other example herein, further comprising: encoding, based on a determination that available uplink resources in the first slot are not sufficient for CG-UCI, at least the portion of the information in the first portion of the CG-PUSCH to include the grant-based UCI rate-matched to the available uplink resources.

Example 17 includes a method of configured grant transmission, the method comprising: determining a mini-slot PUSCH is to span a boundary between a first slot and a second slot; encoding first and second portions of the mini-slot PUSCH, wherein CG-UCI that corresponds to the mini-slot PUSCH is included in either the first portion or the second portion; performing one or more listen-before-talk (LBT) operations; and transmitting the first portion in the first slot or the second portion in the second slot based on the performing of the one or more LBT operations.

Example 18 may include the method of example 17 or some other example herein, further comprising: mapping the CG-UCI to whichever of the first portion or the second portion has a relatively greater length.

Example 19 may include the method of example 17 or some other example herein, further comprising: determining a first LBT operation of the one or more LBT operations is successful; and transmitting the first portion in the first slot and the second portion in the second slot based on the first LBT operation.

Example 20 may include the method of example 17 or some other example herein, further comprising: dropping the first portion based on a determination that a first LBT operation of the one or more LBT operations is unsuccessful; and transmitting the second portion based on a determination that a second LBT operation of the one or more LBT operations is successful.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-64, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, storage-media having instructions that, when executed, cause processing circuitry to:
    determine a configured grant-physical uplink shared channel (CG-PUSCH) is to be transmitted in a mini-slot that includes a time allocation that spans across a slot boundary;
    select uplink control information (UCI) to include grant-based UCI or configured grant-uplink control information (CG-UCI) based on the mini-slot including the time allocation that spans across the slot boundary;
    encode the CG-PUSCH with the UCI to be transmitted in the mini-slot; and
    encode a plurality of CG-PUSCHs of a configured grant (CG) burst to be transmitted in a respective plurality of mini-slots, wherein CG-PUSCHs to be transmitted in mini-slots that do not include time allocations that span across slot boundaries are to include respective CG-UCIs and CG-PUSCHs to be transmitted in mini-slots that do include time allocations that span across slot boundaries are not to include respective CG-UCIs.

2. The one or more non-transitory, storage-media of claim 1, wherein to select the UCI the processing circuitry is to: select the UCI to include the grant-based UCI without the CG-UCI based on the mini-slot including the time allocation that spans across the slot boundary.

3. The one or more non-transitory, storage-media of claim 1, wherein the CG-PUSCH is a first CG-PUSCH, the CG-UCI is a first CG-UCI, the mini-slot is a first mini-slot, and the instructions, when executed, are to further cause the processing circuitry to:
    encode a second CG-PUSCH to be transmitted in a second mini-slot, the second CG-PUSCH to include a second CG-UCI that includes an indication of a starting symbol and length value (SLIV) for the second mini-slot.

4. The one or more non-transitory, storage-media of claim 3, wherein the SLIV is to indicate that the second CG-PUSCH starts at a first orthogonal frequency division multiplexing (OFDM) symbol, wherein the second CG-PUSCH starts at a second OFDM symbol that is a third number of OFDM symbols after the first OFDM symbol, wherein the number of OFDM symbols corresponds to a length of a listen-before-talk (LBT) gap that starts at the first OFDM symbol.

5. The one or more non-transitory, storage-media of claim 4, wherein the instructions, when executed, further cause the processing circuitry to: identify a configured SLIV for the second CG-PUSCH, wherein both the SLIV and the configured SLIV are to indicate the second CG-PUSCH is to start at the first OFDM symbol.

6. The one or more non-transitory, storage-media of claim 3, wherein the SLIV is to indicate that the second CG-PUSCH starts at a first orthogonal frequency division multiplexing (OFDM) symbol, wherein the second CG-PUSCH starts at the first OFDM symbol and a listen-before-talk (LBT) gap ends at a second OFDM symbol that immediately precedes the first OFDM symbol.

7. The one or more non-transitory, storage-media of claim 1, wherein the CG-PUSCH is a first CG-PUSCH, the CG-UCI is a first CG-UCI, the mini-slot is a first mini-slot, and the instructions, when executed, are to further cause the processing circuitry to:
    encode a second CG-PUSCH to be transmitted in a second mini-slot, the second CG-PUSCH to include a second CG-UCI that includes an indication of a repetition number corresponding to the second CG-PUSCH.

8. The one or more non-transitory, storage-media of claim 1, wherein the instructions, when executed, further cause the processing circuitry to:
    determine a type or duration of the CG-PUSCH; and
    select the UCI to include the grant-based UCI or the CG-UCI based on the type or duration of the CG-PUSCH.

9. An apparatus comprising:
    protocol processing circuitry to:
        identify information to be transmitted in a configured grant-physical uplink shared channel (CG-PUSCH), the information to include configured grant-uplink control information (CG-UCI);
        determine, based on starting symbol and length values, uplink resources for CG-PUSCH;
        determine the uplink resources span a slot boundary between a first slot and a second slot;
        encode at least a portion of the information in a first portion of the CG-PUSCH; and
        map a demodulation reference signal (DMRS) to a first symbol that corresponds to the starting symbol and map the CG-UCI to a second symbol that immediately follows the first symbol, wherein the first and second symbols are in the first slot; and
    interface circuitry coupled with the protocol processing circuitry to communicatively couple the protocol processing circuitry with a component of a device.

10. The apparatus of claim 9, wherein the protocol processing circuitry is further to: puncture a second portion of the CG-PUSCH corresponding to uplink resources in the second slot.

11. The apparatus of claim 9, wherein the CG-PUSCH is a first CG-PUSCH, the CG-UCI is a first CG-UCI, and the slot boundary is a first slot boundary, and the protocol processing circuitry is further to:
- determine a second CG-PUSCH is to cross a second slot boundary between a third slot and a fourth slot; and
- drop the second CG-PUSCH based on a determination that a number of symbols to transmit a demodulation reference signal (DMRS) and a second CG-UCI of the second CG-PUSCH is greater than a number of available symbols in the third slot for transmission of a first portion of the second CG-PUSCH.

12. A method of operating processing circuitry, the method comprising:
- identifying information to be transmitted in a configured grant-physical uplink shared channel (CG-PUSCH), the information to include configured grant-uplink control information (CG-UCI);
- determining, based on starting symbol and length values, uplink resources for CG-PUSCH;
- determining the uplink resources span a slot boundary between a first slot and a second slot;
- encoding at least a portion of the information in a first portion of the CG-PUSCH; and
- encoding at least another portion of the information in a second portion of the CG-PUSCH for transmission in the second slot.

13. The method of claim 12, wherein:
- the first portion of the CG-PUSCH includes a first CG-UCI that includes an indication of a first starting symbol and length value (SLIV) that corresponds to a first length of the first portion of the CG-PUSCH;
- the second portion of the CG-PUSCH includes a second CG-UCI that includes an indication of a second SLIV that corresponds to a second length of the second portion of the CG-PUSCH; and
- the length corresponding to the CG-PUSCH is equal to a sum of the first length and the second length.

14. The method of claim 12, wherein the method of operating the processing circuitry further comprises: encoding, based on a determination that available uplink resources in the first slot are not sufficient for CG-UCI, at least the portion of the information in the first portion of the CG-PUSCH to include the CG-UCI rate-matched to the available uplink resources.

* * * * *